(12) United States Patent
Ren et al.

(10) Patent No.: US 11,797,288 B2
(45) Date of Patent: Oct. 24, 2023

(54) PATCHING METHOD, RELATED APPARATUS, AND SYSTEM

(71) Applicant: Huawei Technologies Co., Ltd., Shenzhen (CN)

(72) Inventors: Wenjie Ren, Beijing (CN); Qiaosheng Han, Wuhan (CN); Yonghong Yin, Beijing (CN); Yingwei Li, Beijing (CN); Jinpeng Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 193 days.

(21) Appl. No.: 17/604,048

(22) PCT Filed: Apr. 13, 2020

(86) PCT No.: PCT/CN2020/084364
§ 371 (c)(1),
(2) Date: Oct. 15, 2021

(87) PCT Pub. No.: WO2020/211712
PCT Pub. Date: Oct. 22, 2020

(65) Prior Publication Data
US 2022/0188093 A1    Jun. 16, 2022

(30) Foreign Application Priority Data
Apr. 17, 2019    (CN) .................. 201910321094.5

(51) Int. Cl.
*G06F 8/65*    (2018.01)
*G06F 8/61*    (2018.01)
(Continued)

(52) U.S. Cl.
CPC ............... *G06F 8/63* (2013.01); *G06F 8/65* (2013.01); *G06F 8/66* (2013.01); *G06F 16/182* (2019.01);
(Continued)

(58) Field of Classification Search
CPC . G06F 16/188; G06F 8/66; G06F 8/65; G06F 16/182; G06F 11/1464; G06F 8/63
See application file for complete search history.

(56) References Cited

U.S. PATENT DOCUMENTS 6,604,236 B1 *   8/2003   Draper .................... G06F 8/66
                                                  717/170
7,711,706 B2     5/2010   Manapetty et al.
(Continued)

FOREIGN PATENT DOCUMENTS

CN    102831001 A    12/2012
CN    102945170 A    2/2013
(Continued)

OTHER PUBLICATIONS

Heart with Shadow with, Making the Image File Infinitely Small—Making the Minimal Image of Encrypted Disc, Software , 2005, Issue 09, 5 pages (with an English abstract), 4 pages.
(Continued)

*Primary Examiner* — Tuan A Vu
(74) *Attorney, Agent, or Firm* — Conley Rose, P.C.

(57) ABSTRACT

A patching method includes generating an original image through compilation for a plurality of files. If a first file in the plurality of files changes, a new index mode of the first file or new data of the first file may be appended to an end of an original image to update the first file to obtain a new image.

20 Claims, 25 Drawing Sheets

(51) Int. Cl.
*G06F 16/188* (2019.01)
*G06F 16/182* (2019.01)
*G06F 11/14* (2006.01)

(52) U.S. Cl.
CPC ........ *G06F 16/188* (2019.01); *G06F 11/1464* (2013.01)

(56) References Cited

U.S. PATENT DOCUMENTS

| | | |
|---|---|---|
| 8,312,447 B2 | 11/2012 | Callaghan et al. |
| 10,146,780 B1 | 12/2018 | Bassov |
| 2006/0112113 A1 | 5/2006 | Gu et al. |
| 2007/0226320 A1* | 9/2007 | Hager ................... G06F 16/182 709/219 |
| 2009/0172338 A1 | 7/2009 | Eker et al. |
| 2010/0077387 A1 | 3/2010 | Callaghan et al. |
| 2012/0054743 A1 | 3/2012 | Fujiwara |
| 2014/0089264 A1* | 3/2014 | Talagala ............ G06F 11/1448 707/649 |
| 2014/0237008 A1* | 8/2014 | Mason, Jr. ......... G06F 11/1464 707/827 |
| 2015/0067706 A1* | 3/2015 | Searls ................... G06F 16/188 707/638 |
| 2015/0301823 A1 | 10/2015 | Hatakeyama |

FOREIGN PATENT DOCUMENTS

| | | |
|---|---|---|
| CN | 103123588 A | 5/2013 |
| CN | 105205118 A | 12/2015 |
| CN | 107704255 A | 2/2018 |
| CN | 108228224 A | 6/2018 |
| CN | 108279922 A | 7/2018 |
| CN | 110109695 A | 8/2019 |
| JP | 2005251045 A | 9/2005 |
| JP | 2012234563 A | 11/2012 |
| JP | 2015207145 A | 11/2015 |
| WO | 2013100302 A1 | 7/2013 |
| WO | 2018218848 A1 | 12/2018 |

OTHER PUBLICATIONS

Wikipedia, "inode," Apr. 4, 2019, XP055901428, 5 pages.
Wikipedia, "File system," Apr. 8, 2019, XP055901417, 24 pages.

* cited by examiner

PATCHING METHOD, RELATED APPARATUS, AND SYSTEM

CROSS-REFERENCE TO RELATED APPLICATIONS

This is a U.S. National Stage of International Patent Application No. PCT/CN2020/084364 filed on Apr. 13, 2020, which claims priority to Chinese Patent Application No. 201910321094.5 filed on Apr. 17, 2019. Both of the aforementioned applications are hereby incorporated by reference in their entireties.

TECHNICAL FIELD

Embodiments of this application relate to the field of computer technologies, and in particular, to a patching method, a related apparatus, and a system.

BACKGROUND

Incremental updates may allow users to reduce traffic in updating software on both a client and a server side. Simply, an incremental update is to find different parts between software of a new version and software of an old version (this process is also referred to as differentiation) by using an algorithm (for example, a binary software difference (binary software difference, bsdiff) algorithm), and extract the different parts to form a patch (patch). The patch may also be referred to as a differential package. When detecting an update, the client only needs to download the differential package to a local host, and then merge the differential package into a local software installation package to form a new version of software installation package. After file check is successful, the client installs the software.

Generally, there are currently two differentiation methods: block-based differentiation and file-based differentiation. However, neither method can accurately pinpoint a relationship between modification and a differential component. As a result a small change causes an excessively large patch (for example, a differential package of hundreds of megabytes).

SUMMARY

Embodiments of this application provide a patching method, a related apparatus, and a system, to form a small patch (for example, approximately 5 MB) to implement a software update, thereby reducing patch download traffic, and reducing a space requirement on a patch partition.

According to a first aspect, this application provides a patching method. The patching method may be applied to a server side. The method may include: A server may generate a new image based on an original image and a changed first file. The first file is a changed file in the original image. Then, the server may write the new image into a virtual block device, and the virtual block device may be obtained by mapping a first block device and a second block device. The second block device stores the original image. The server may write differential data between the new image and the original image into the first block device based on a mapping relationship from the virtual block device to the first block device and the second block device. Finally, the server may send a patch to an electronic device, where the patch includes the differential data stored in the first block device.

According to a second aspect, this application provides a patching method. The patching method may be applied to an electronic device (such as mobile phone) side. The method may include: An electronic device receives a patch sent by a server. After receiving the patch, the electronic device may write differential data in the patch into a first block device. Then, the electronic device may map the first block device and a second block device to a virtual block device. Data stored in the virtual block device constitutes a new image. Finally, the electronic device may mount the virtual block device to read and install the new image.

In the first aspect and the second aspect, the new image may include a first part and a second part, a disk layout of the first part is the same as a disk layout of the original image, the second part is appended to an end of the first part, and the second part includes a first index node inode, and the first inode is an inode of a changed first file. The differential data in the patch may include the following two parts of data: the second part and differential data between the first part and the original image.

In the first aspect and the second aspect, an inode of the first file in the first part of the new image is invalid. "invalid" means that an attribute (such as a file size, a file type, a file creation time, or a file modification time) of the changed first file in the new image and a pointer of a data block of the changed first file in the new image are no longer determined based on the inode of the first file in the first part, but are determined based on the first inode in the second part.

It can be learned that, through implementation of the methods described in the first aspect and the second aspect, because the disk layout of the first part of the new image is the same as the disk layout of the original image, there is little or even no non-zero differential data between the first part and the original image, a large amount of zero differential data occurs, and the patch is quite small.

With reference to the first aspect or the second aspect, in some embodiments, in addition to the first inode, the second part may further include a new data block of the first file. In this application, the new data block may be referred to as a first data block. In the new image, data blocks of the first file may include the new data block and a data block of the first file in the first part. Pointers in the new inode may point to the new data block and the data block of the first file in the first part.

Optionally, data of the data block of the first file in the first part may be the same as data of a data block of the first file in the original image. In this case, the differential data between the first part and the original image is 0. This is not limited. The data of the data block of the first file in the first part may be alternatively different from the data of the data block of the first file in the original image. In this application, the data block of the first file in the first part may be referred to as a second data block, and the data block of the first file in the original image may be referred to as a third data block.

This embodiment may be used for the following scenario: Data of the first file is modified, the data block of the first file in the original image is insufficient to carry data of the changed first file, and the inode of the first file also becomes larger.

With reference to the first aspect or the second aspect, in some embodiments, in addition to the first inode, the second part may further include a new data block storing full data of the changed first file. In this application, the new data block may be referred to as a fourth data block. The new data block of the first file may be a group of consecutive disk blocks, and may be used to store the full data of the changed first file. A pointer in the first inode may point to the fourth data block. In this case, the differential data between the first part and the original image is 0. Non-zero differential data in the patch includes only the second part.

Optionally, the fourth data block may be a group of consecutive disk blocks, and is used to store the full data of the changed first file.

This embodiment may be used for the following scenario: Data in a data block is not compressed. The data block of the first file in the original image is insufficient to carry data of the changed first file, and the inode of the first file also becomes larger.

With reference to the first aspect or the second aspect, in some embodiments, the pointer in the first inode may point to the data block of the first file in the first part. In the new image, the data block of the first file is the data block of the first file in the first part. The data of the data block and the data of the data block of the first file in the original image may be the same or different. In this application, the data block of the first file in the first part may be referred to as a second data block, and the data block of the first file in the original image may be referred to as a third data block.

This embodiment may be used for the following scenario: Description information of the first file changes, and the inode of the first file in the original image is insufficient to carry description information of the changed first file and pointer information of the data block of the first file. The data of the first file does not change, or the data block of the first file in the original image can carry the data of the changed first file. If the data of the first file does not change, the data of the data block of the first file in the first part of the new image is the same as the data of the data block of the first file in the original image. If the data of the first file changes, the data of the data block of the first file in the first part of the new image is different from the data of the data block of the first file in the original image.

With reference to the first aspect or the second aspect, in some embodiments, the new image may be written into the virtual block device in the following two manners: Manner 1: When the virtual block device is read-only, the new image may be written based on a write interface (for example, a memcopy interface) of a disk block. Manner 2: When the virtual block device is writable, the virtual block device may be mounted, and then the new image is written based on a file read/write interface.

With reference to the first aspect or the second aspect, in some embodiments, differential data on the first block device (for example, a delta device 53) may be determined by comparing the virtual block device (for example, a virtual block device 50) and the second block device (for example, a block device 52) disk block by disk block. Two disk blocks that are separately located in the virtual block device and the second block device and that have a same block number may be referred to as a first disk block and a second disk block. Differential data between the two disk blocks may be written into a third disk block. The third disk block is located in the first block device, and has a same block number as the first disk block. For example, Δdata 3 written into the delta device 53 is differential data between data 3-1' on the virtual block device 50 and data 3 on the block device 52. It should be understood that, when data of the first disk block is the same as data of the first disk block, the differential data written into the third disk block is 0. For example, differential data between an inode 1 on the virtual block device 50 and an inode 1 on the block device 52 is 0.

With reference to the first aspect or the second aspect, in some embodiments, the patch may further carry a mapping table, so that after downloading the patch, the electronic device merges the patch and the original image into the new image based on the mapping table. Specifically, when the virtual block device and the second block device are compared disk block by disk block, the mapping relationship may be determined, and further, the mapping table is determined based on the mapping relationship.

With reference to the first aspect or the second aspect, in some embodiments, a disk block (which may be referred to as a first disk block) configured for check data in the delta device may be used to carry a part of differential data, where the part of differential data is the second part of the new image. In other words, the part of differential data (namely, the second part of the new image) may be written by using occupied bits of the check data on the delta device, without a need to additionally allocate a disk block at a tail of the delta device to write the part of differential data, so that sizes of the delta device and the block device that stores the original image can be the same. Therefore, the patch is matched with the original image.

According to a third aspect, this application provides a server, including a plurality of functional units, configured to correspondingly perform the method provided in any one of the possible implementations of the first aspect.

According to a fourth aspect, an electronic device is provided, including a plurality of functional units, configured to correspondingly perform the method provided in any one of the possible implementations of the second aspect.

According to a fifth aspect, a server is provided. The server is configured to perform the patching method described in the first aspect. The server may include a memory, a processor coupled to the memory, a transmitter, and a receiver. The transmitter is configured to send a signal (for example, a patch) to another device, for example, an electronic device. The receiver is configured to receive a signal sent by another device, for example, an electronic device. The memory is configured to store implementation code of the patching method described in the first aspect. The processor is configured to execute the program code stored in the memory, in other words, perform the patching method described in any one of the possible implementations of the first aspect.

According to a sixth aspect, an electronic device is provided. The electronic device is configured to perform the patching method described in the second aspect. The electronic device may include a memory, a processor coupled to the memory, a transmitter, and a receiver. The transmitter is configured to send a signal to another device, for example, a server. The receiver is configured to receive a signal (for example, a patch) sent by another device, for example, a server. The memory is configured to store implementation code of the patching method described in the second aspect. The processor is configured to execute the program code stored in the memory, in other words, perform the patching method described in any one of the possible implementations of the second aspect.

According to a seventh aspect, a communications system is provided. The communications system includes a server and an electronic device. The server may be the server described in the first aspect. The electronic device may be the electronic device described in the second aspect.

According to an eighth aspect, a computer-readable storage medium is provided. The readable storage medium stores instructions, and when the instructions run on a computer, the computer is enabled to perform the patching method described in the first aspect.

According to a ninth aspect, another computer-readable storage medium is provided. The readable storage medium stores instructions, and when the instructions run on a computer, the computer is enabled to perform the patching method described in the second aspect.

With reference to a tenth aspect, a computer program product including instructions is provided. When the computer program product runs on a computer, the computer is enabled to perform the patching method described in the first aspect.

With reference to an eleventh aspect, another computer program product including instructions is provided. When the computer program product runs on a computer, the computer is enabled to perform the patching method described in the second aspect.

DESCRIPTION OF EMBODIMENTS

Terms used in the following embodiments of this application are merely for the purpose of describing specific embodiments, but are not intended to limit this application.

Figure 1A:
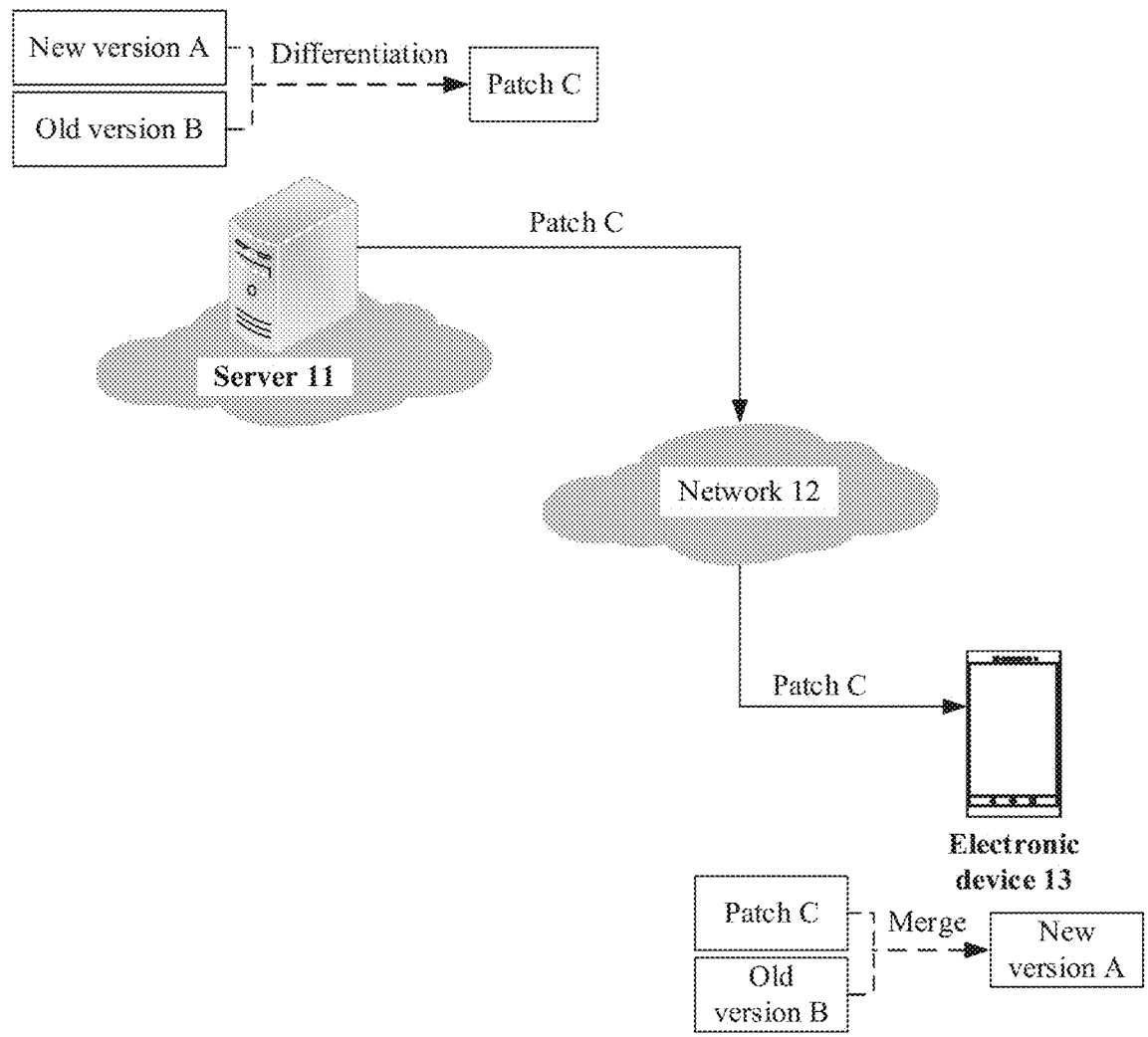
FIG. 1A is a schematic diagram of an architecture of a communications system according to this application.

FIG. 1A illustrates a communications system in this application. As shown in FIG. 1A, the communications system may include a server 11 and an electronic device 53. The electronic device 53 may communicate with the server 11 through a network 12 (for example, the Internet). A software developer may generate a patch (patch) of software on the server 11. For example, a patch C may be generated by comparing a difference between a new version A and an old version B. The electronic device 53 may download the patch C from the server 11 through the network 12, merge the patch C and the locally stored old version B to obtain the new version A, and finally install the new version A, to implement a software upgrade from the old version B to the new version A.

Figure 1B:
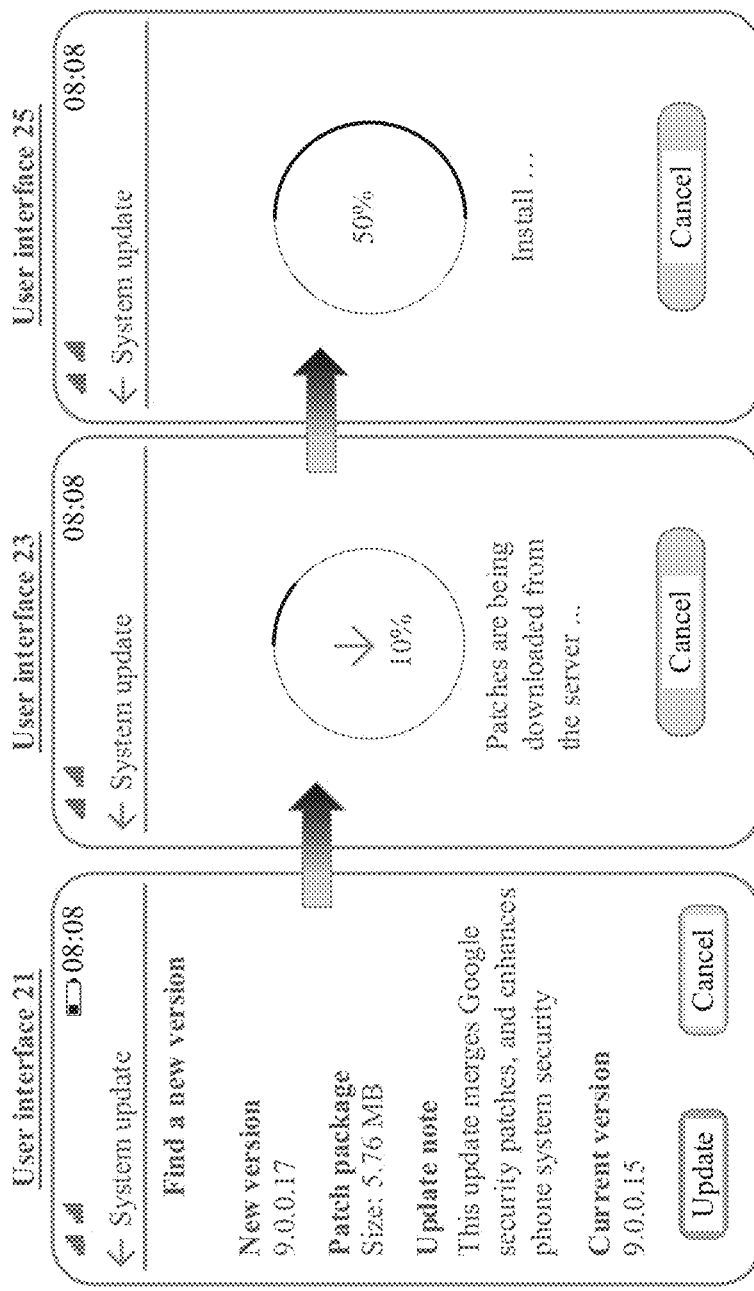
FIG. 1B is a schematic diagram of a user interface of using a patch to update software on an electronic device side.

When detecting a new version, the electronic device 53 may provide user interfaces such as a user interface 21 to a user interface 23 illustrated in FIG. 1B, so that a user understands a software update process. The user interface 21 may be used to present related information of the new version and a patch, for example, a version number (for example, 9.0.0.17) of the new version, a size (for example, 5.76 MB) of the patch, an update note, and a version number (for example, 9.0.0.15) of a current version to the user. The user interface 22 may be used to present a download progress of the patch to the user. The user interface 23 may be used to present an installation process of the new version to the user.

If the software has a plurality of old versions, the software developer may separately generate patches for the plurality of old versions. The electronic device may download a corresponding patch based on an existing local old version. For example, for the new version A, a plurality of patches patch C1, patch C2, and patch C3 respectively corresponding to old versions B1, B2, and B3 are generated on the server 11. If the existing local old version in the electronic device 53 is B1, the electronic device 53 may download the patch C1 from the server 11, to implement an upgrade from the old version B1 to the new version A. If the existing local old version in the electronic device 53 is B2, the electronic device 53 may download the patch C2 from the server 11, to implement an upgrade from the old version B2 to the new version A.

Figure 1C:
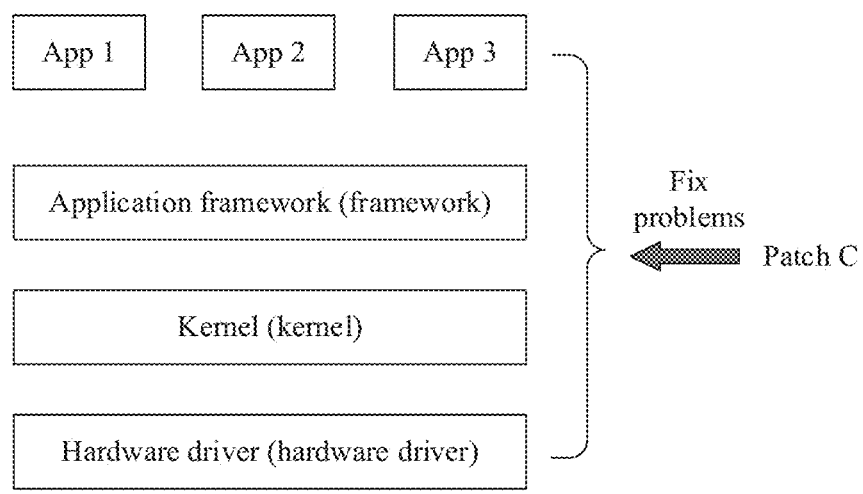
FIG. 1C is a schematic diagram of code composition of a patch in an Android operating system.

The patches generated on the server 11 may be used to fix one or more software bugs, or may be used to add one or more new product features or functions. For example, in an Android operating system, as shown in FIG. 1C, the patch C may include bug fixing code for fixing one or more of an application (application, APP), an application framework (application framework), a kernel (kernel), a hardware driver (hardware driver), and the like. The patch C may further include implementation code of a new product feature or function.

Figure 2:
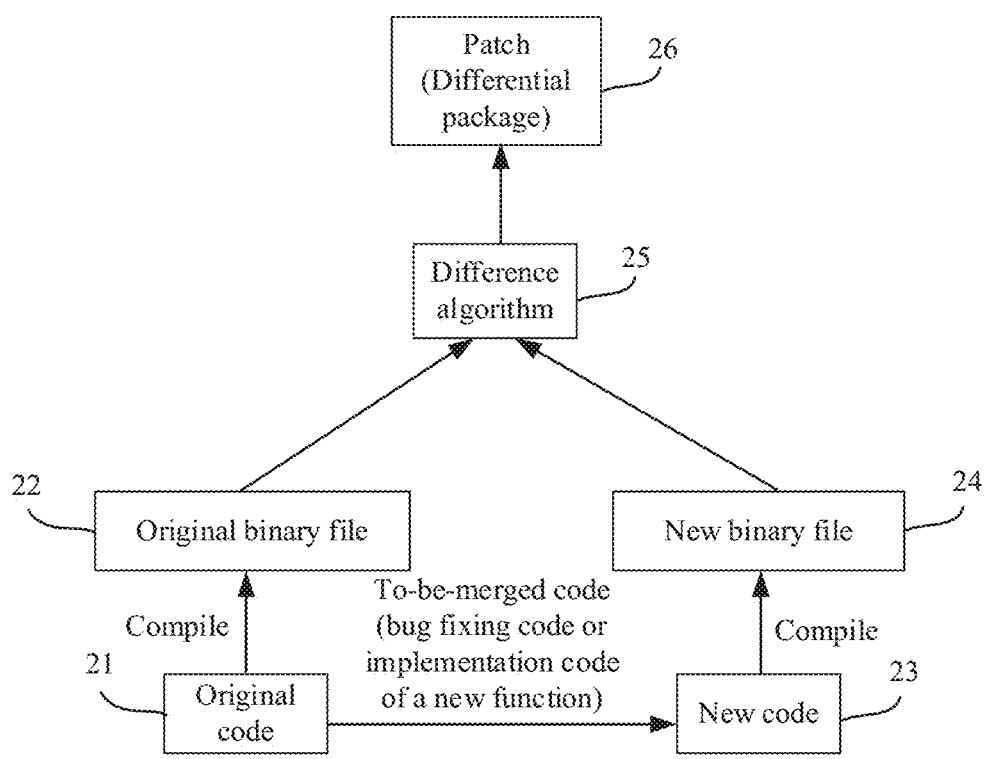
FIG. 2 is a schematic diagram of an existing patch generation process.

In the conventional technology, for patch generation, refer to a process shown in FIG. 2. As shown in FIG. 2, a patch 26 may be obtained by comparing an original binary file 22 with a new binary file 24 based on a difference algorithm 25. The original binary file 22 (for example, an .img file) is obtained by compiling original code 21, and the new binary file 24 (for example, an .img file) is obtained by compiling new code 23. The new code 23 is obtained by merging bug fixing code or implementation code of a new function based on the original code 21.

A size of a patch is usually a key issue for an incremental update. Reducing the size of the patch can effectively reduce patch download traffic, and can implement fast installation and a fast update, so that a public opinion issue is addressed. The public opinion issue usually arises suddenly and needs to be addressed in a short time.

However, in a Linux file system, an existing patch generation method leads to a case in which a small change causes an excessively large patch (for example, a differential package of hundreds of megabytes). The following analyzes the existing patch generation method from aspects (1) and (2).

(1) Disk Layout of the Linux File System

Figure 3A:
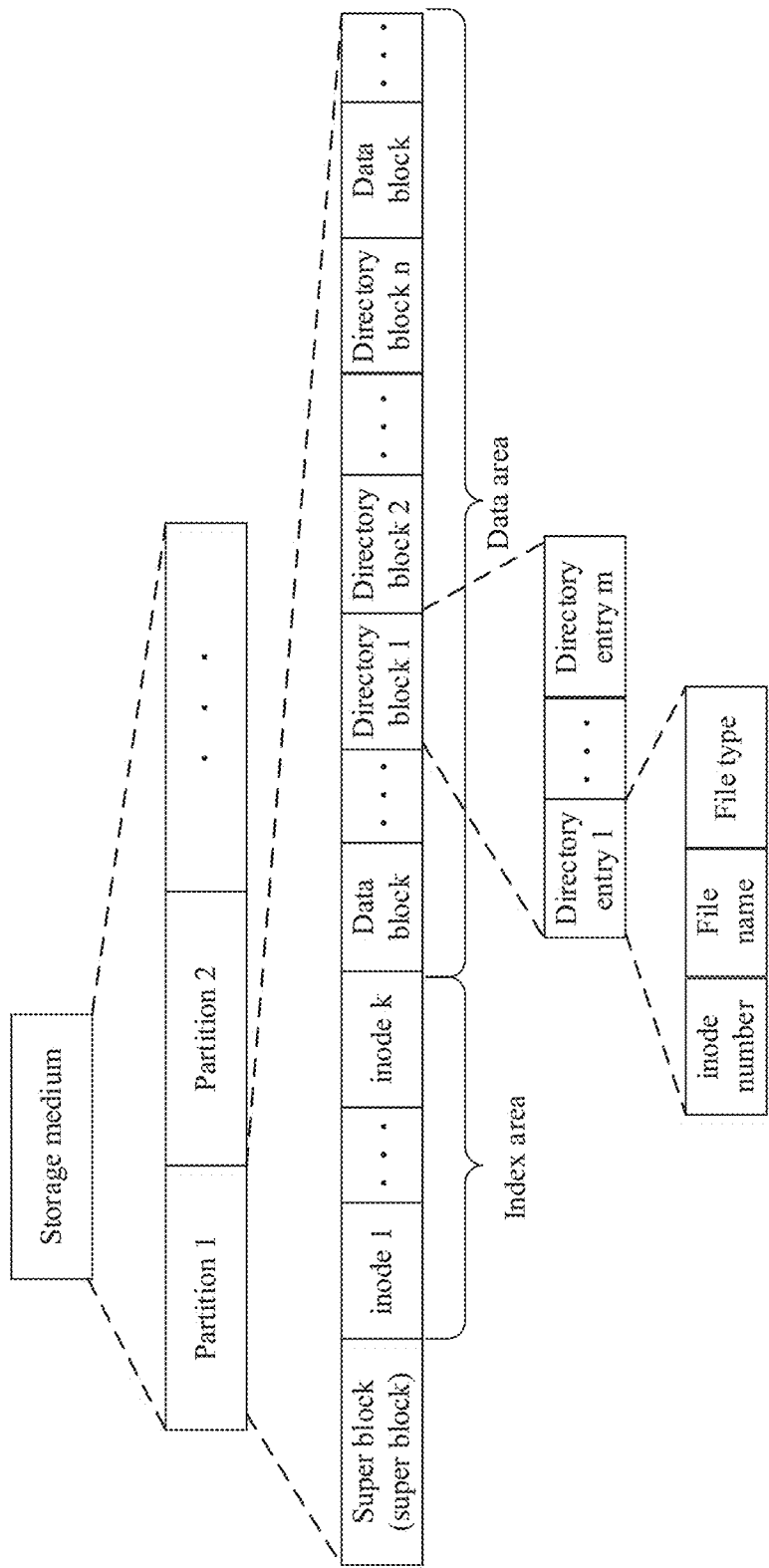
FIG. 3A is a schematic diagram of a disk layout of a Linux file system.

FIG. 3A illustrates a disk layout of a Linux file system. As shown in FIG. 3A, in the Linux file system, each partition of a storage medium includes a super block (Super block), an index area, and a data area. The super block stores related information of the file system, for example, information such as a type of the file system, a quantity of disk blocks (blocks), and a size of a disk block. The index area includes k (k≥1) inodes, and each inode includes description information (such as a file size, a file type, a file creation time, or a file modification time) of a file and a plurality of pointers pointing to disk blocks that store data of the file. In addition to common files such as a header file *.h, a C code source file *.c, and a C++ code source file *.cpp, files may further include a directory (directory) file, a symbol link (symbol link) file, and the like. Data in the data area may include data of a common file and data of a directory file. Data of the files in the data area is stored based on disk blocks. The disk blocks that store the data of the files may be referred to as data blocks. The directory file may include n (n≥1) directory blocks, each directory block may include a plurality of directory entries (dentry), one directory entry corresponds to one file, and each directory entry may include an index (inode) number of one file, a file name of the file, a file type of the file, and the like.

In the Linux file system, one file may include a directory entry, an inode, and a data block.

The concept of the disk block mentioned in this application does not mean that the storage medium is limited only to a disk, and the disk block is a basic read/write unit of a file system. The disk block needs to be mapped to a physical sector (sector). A size of the disk block is an integer multiple of a size of the sector.

In the disk layout illustrated in FIG. 3A, data stored in the data area may be data obtained after compression processing, or may be data obtained without compression processing. Data of a same file (such as a common file or a directory file) may be stored in consecutive disk blocks or cross-stored in inconsecutive disk blocks. For example, as illustrated in FIG. 3B, disk blocks A1 to An store data of a same file, and disk blocks B1 to Bx+1 and disk blocks C1 and C2 may cross-store data of different files.

Figure 3B:
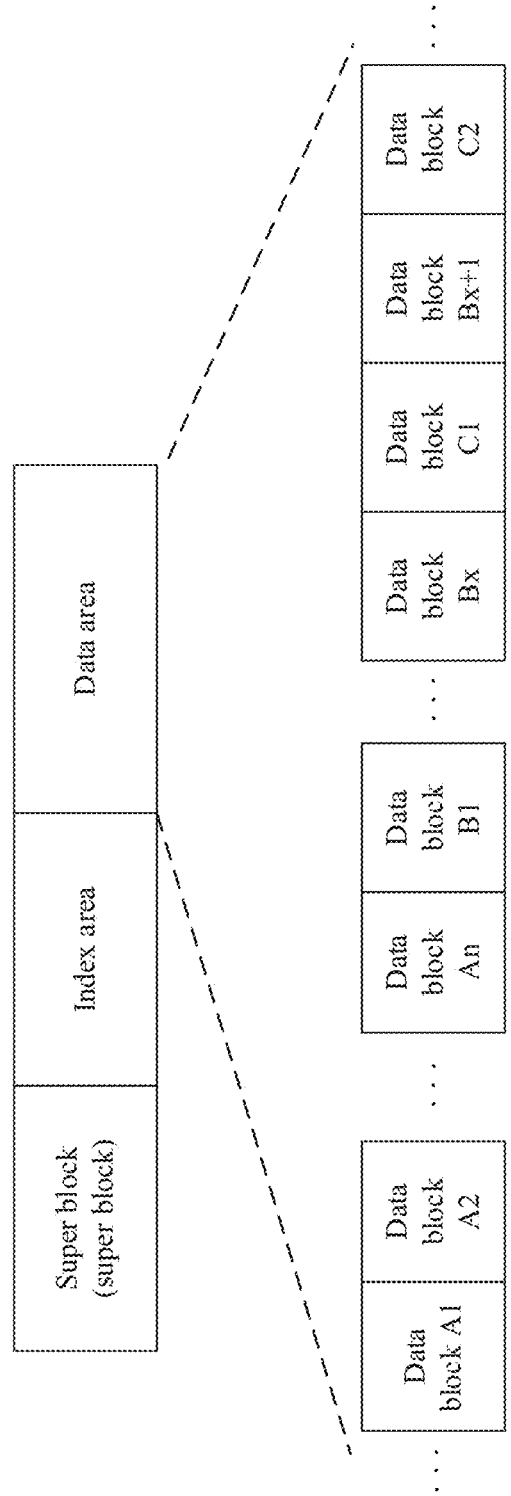
FIG. 3B is a schematic diagram of a disk layout in which data blocks of a plurality of files are arranged through staggering.
Figure 3C:
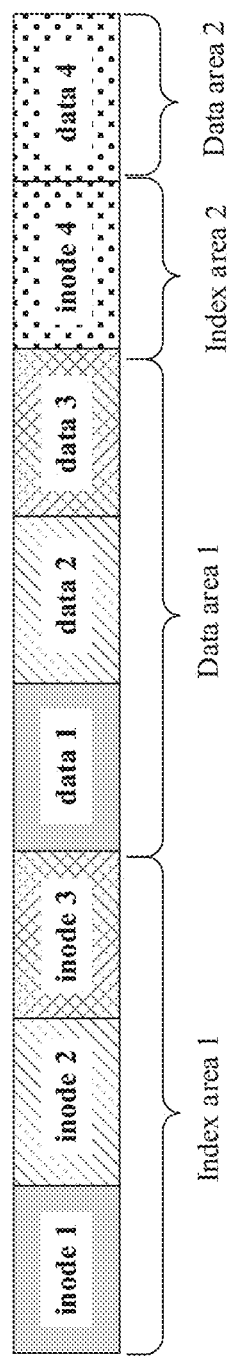
FIG. 3C is a schematic diagram of a disk layout in which index areas and data areas are alternately arranged.

Not limited to FIG. 3A or FIG. 3B, index areas and data areas may be alternately arranged. For example, as illustrated in FIG. 3C, an inode (namely, an inode 4) of a file 4 may be arranged after data areas of a file 1 to a file 3, and a data part (namely, data 4) of the file 4 is arranged after the inode 4.

(2) In the conventional technology, based on the disk layout of the file system illustrated in FIG. 3A, when one file changes, an index node (inode) corresponding to the file may be inflated (inflate). As a result, disk blocks after the inode all change, and a quite large differential package is caused.

Figure 4A:
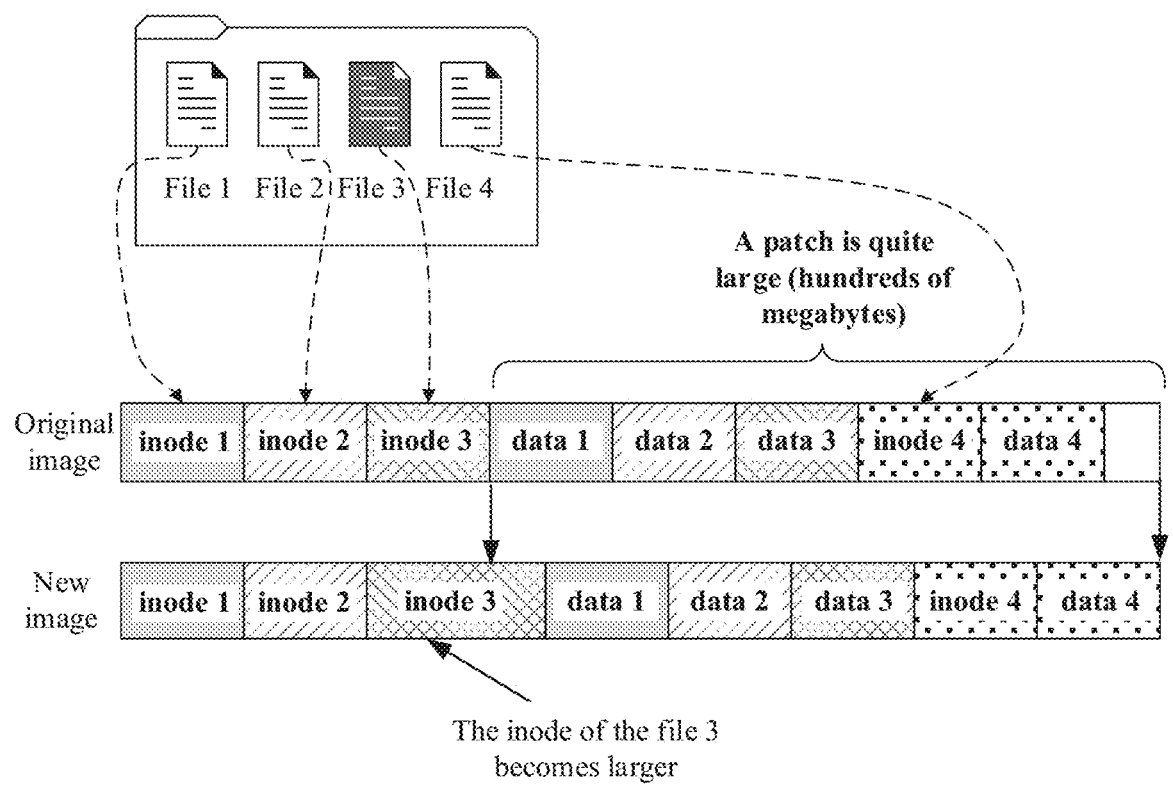
FIG. 4A is a schematic diagram of an overall disk layout offset caused by a file change in the conventional technology.

Referring to a disk layout of an original image illustrated in FIG. 4A, the original image includes inodes and data blocks of a plurality of files, and the inodes and the data blocks of the plurality of files are closely arranged, where modes of a file 1 to a file 4 are respectively an inode 1, an inode 2, an inode 3, and an inode 4, and data blocks of the file 1 to the file 4 are respectively data 1, data 2, data 3, and data 4. The file 3 changes, and the inode 3 becomes larger. When the inode 3 becomes larger, data of disk blocks after the inode 3 in a new image changes. As a result, a quite large differential package is caused. Herein, the original image is a file system image obtained by compiling software code of an old version, and the new image is a file system image obtained by compiling software code of a new version. The file 3 may be a source code file such as *.c, a configuration file such as *.config, a directory file, or the like. The change of the file 3 may mean that data (namely, file content) of the file 3 changes, or an attribute (such as a file size, a file type, a file creation time, or a file modification time) of the file 3 changes.

Figure 4B:
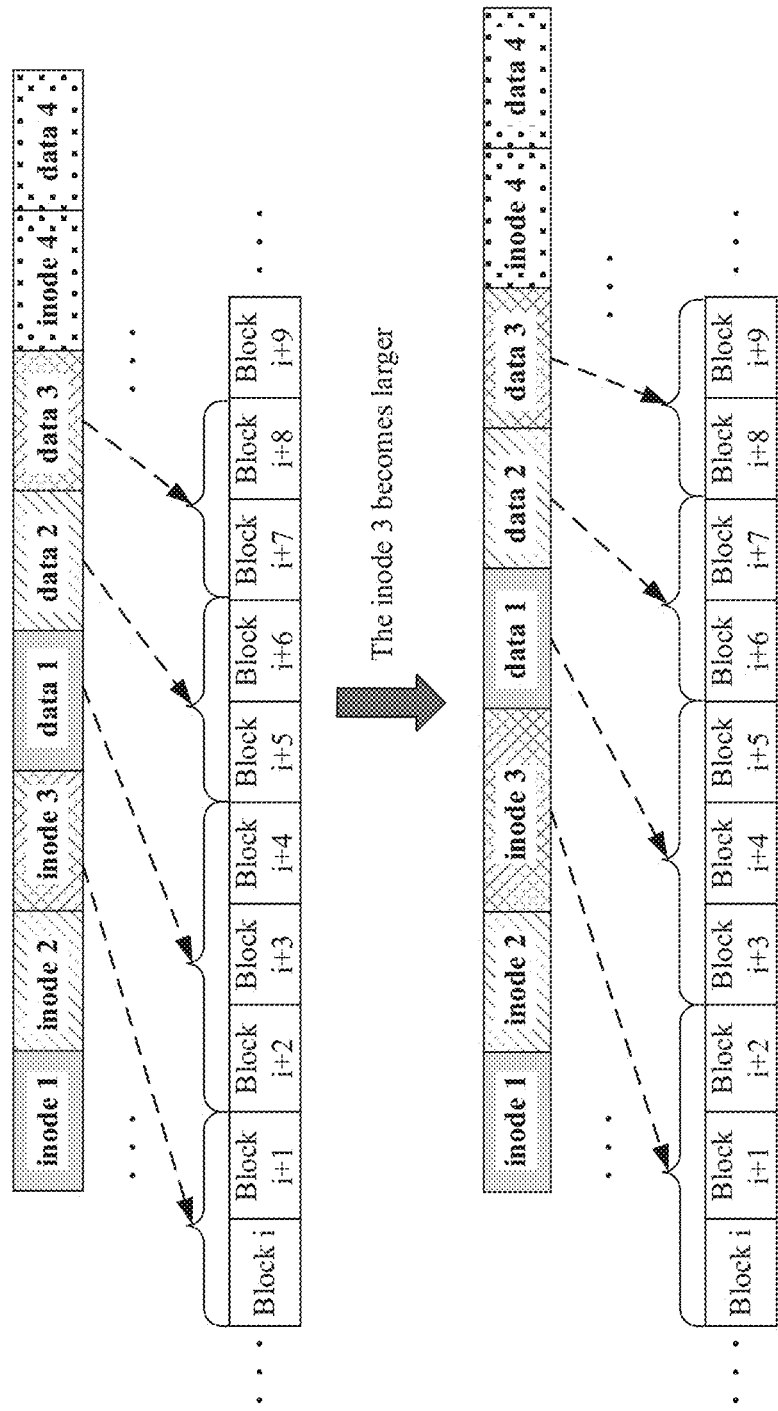
FIG. 4B is a schematic diagram of a cause of the overall disk layout offset in the conventional technology in FIG. 4A.

As shown in FIG. 4B, it is assumed that disk blocks occupied by the inode 3 are a block i to a block i+1, and disk blocks occupied by the data 1, the data 2, and the data 3 after the inode 3 are respectively a block i+2 to a block i+4, a block i+5 and a block i+6, and a block i+7 and a block i+8, where i is a positive integer. When the inode 3 becomes larger, it is assumed that the disk blocks occupied by the inode 3 are inflated to the block i to the block i+2, and the disk blocks occupied by the data 1, the data 2, and the data 3 after the inode 3 all change (or offset). The blocks occupied by the data 1 change to the block i+3 to the block i+5, the blocks occupied by the data 2 change to the block i+6 and the block i+7, and the blocks occupied by the data 3 change to the block i+8 and a block i+9. In other words, the data 1, the data 2, and the data 3 all offset by one disk block as a whole. Similarly, disk blocks occupied by the inode 4 and the data 4 also offset. As a result, data of the disk blocks occupied by the data 1 to the data 3 after the inode 3, the inode 4, and the data 4 changes. A disk layout of the new image greatly changes as a whole compared with the disk layout of the original image, and the differential package is quite large.

It can be learned that, in the conventional technology, when a change of software of a new version is relatively small relative to software of an old version, for example, when a file 3 changes, a disk layout of a new image corresponding to the software of the new version greatly changes compared with a disk layout of an original image corresponding to the software of the old version, and a quite large patch is formed. This not only increases consumption of patch download traffic, but also is inapplicable to a scenario in which a patch partition of an electronic device (for example, a mobile phone) is relatively small. Herein, the patch partition is a partition that is in a storage medium and that is used to store a patch, for example, a cache partition (/cache). Common partitions used by a Linux-based embedded system (for example, an Android system) may further include a boot partition (/boot), a system partition (/system), a data partition (/data), and the like. The boot partition may be used to store a system boot file. The system partition may be used to store a system file and a program. The data partition may be used to store data used by an application.

To resolve the problem in the conventional technology, this application provides a patching method, to form a small patch (for example, approximately 5 MB) to implement a software update, thereby reducing patch download traffic, and reducing a space requirement on a patch partition.

In this application, for a plurality of files for generating an original image through compilation, if a file in the plurality of files changes, where the changed file may be referred to as a first file, a new inode of the first file and/or new data of the first file may be appended to an end of the original image, to update the first file to obtain a new image. In this way, by updating the first file at the end of the original image, a change of a disk layout of the new image is quite small as a whole relative to a disk layout of the original image, so that differential data obtained based on the new image and the original image is quite small and a patch is small.

This application may also be applied to a read-only file system. In other words, the original image may be a read-only file system image. In the conventional technology, an image is updated based on a file read/write interface. The file read/write interface is no longer applicable to an original image of the read-only file system. However, in this application, a disk block-based write interface (for example, a memcopy interface) is used to update an inode, a data block, and a dentry of the first file in the original image, to obtain the new image, and therefore this application is applicable to the read-only file system.

The following describes the patching method provided in this application by using specific embodiments.

Embodiment 1

First, how to generate a new image based on an original image is described.

Figure 5:
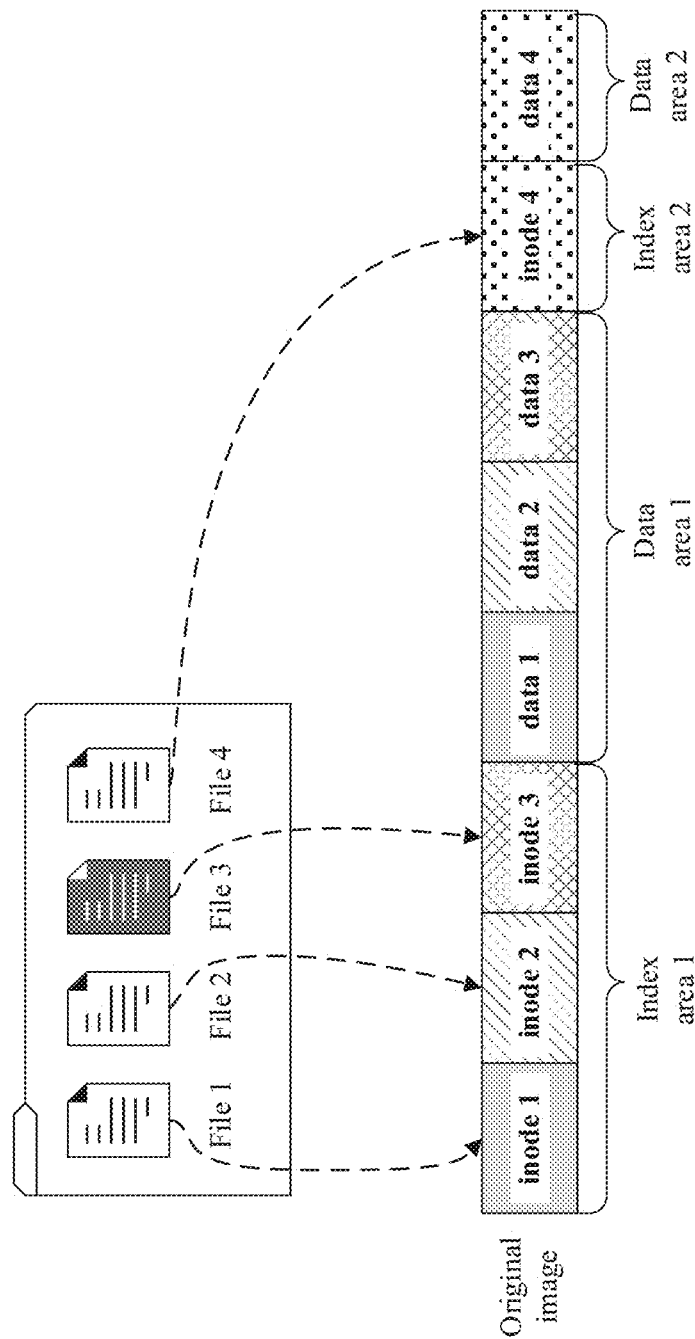
FIG. 5 is a schematic diagram of a disk layout of an original image in an example.

FIG. 5 illustrates a disk layout of an original image. As shown in FIG. 5, the original image may include an index area 1, a data area 1, an index area 2, and a data area 2. The index area 1 may include inodes (shown as an inode 1, an inode 2, and an inode 3 respectively) of a file 1, a file 2, and a file 3, and the data area 1 may include data blocks (shown as data 1, data 2, and data 3 respectively) of the file 1, the file 2, and the file 3. The index area 2 may include an inode (an inode 1) of a file 4, and the data area 2 may include a data block (data 4) of the file 4. The inode 1, the mode 2, and the inode 3 may be arranged adjacent to each other sequentially. The data 1, the data 2, and the data 3 may be arranged adjacent to each other sequentially. The index area 1, the data area 1, the index area 2, and the data area 2 may be arranged adjacent to each other sequentially.

In other words, the original image may include one or more data areas and one or more inode areas. The data area and the inode area may be arranged adjacent to each other. Data blocks of files in the data area may be arranged adjacent to each other, and inodes of files in the inode area may be arranged adjacent to each other. In this way, a disk layout of the original image can be in close arrangement.

Based on the disk layout of the original image illustrated in FIG. 5, assuming that the file 3 changes, FIG. 6 to FIG. 10 illustrate several manners of generating a new image.

Manner 1: Add a new inode and a new data block of the file 3 to an end of the original image, to obtain a new image.

Figure 6:
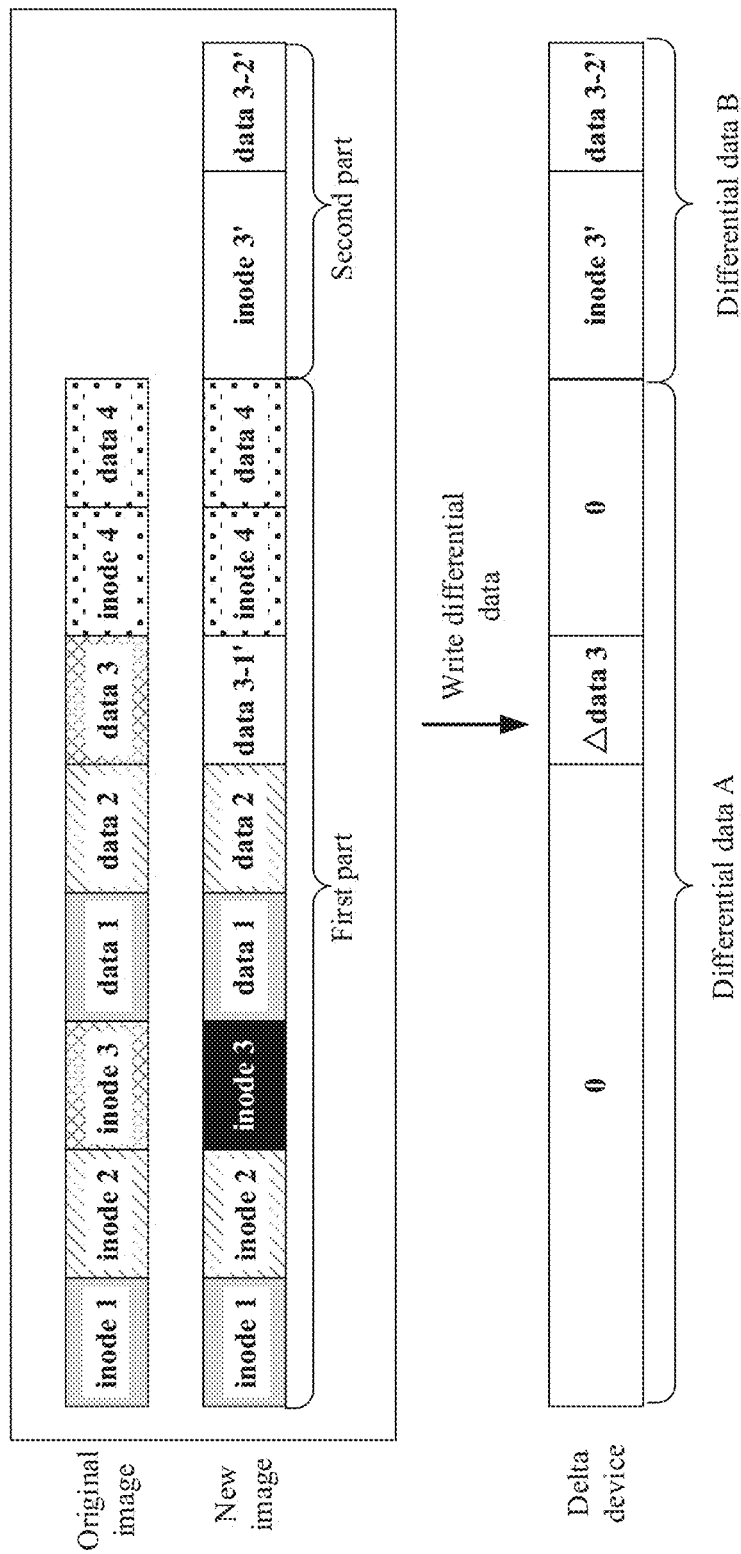
FIG. 6 is a schematic diagram of a manner of generating a new image based on the original image shown in FIG. 5.

As shown in FIG. 6, the new image may include a first part and a second part. A disk layout of the first part is the same as a disk layout of the original image. The second part may include the new inode (namely, an inode 3') and the new data block data 3-2'. The second part is appended at an end of the first part.

In the new image, data blocks of the file 3 may include the new data block data 3-2' and a data block data 3-1' of the file 3 in the first part. Data of the data block data 3-1' and data of the data block data 3 may be different.

The new inode may include new description information, such as a creation time, of the file 3 and a pointer pointing to the data block of the file 3. The inode (namely, the inode 3) of the file 3 in the first part is invalid. Herein. "invalid" means that an attribute of the changed file 3 (such as the creation time of the file 3) and the pointer pointing to the data block of the file 3 are not determined based on the inode 3 in the new image.

Usually, Manner 1 may be used for the following scenario: Data of the file 3 is modified, the data block of the file 3 in the original image is insufficient to carry data of the changed file 3, and the inode of the file 3 also becomes larger.

For Manner 1, generally, when a file in the original image changes, the new image may be generated based on the original image. The changed file may be referred to as a first file. The first file may be one or more files. The new image may include two parts: a first part and a second part, the second part is appended to an end of the first part, a disk layout of the first part is the same as a disk layout of the original image, and the second part may include a new inode and a new data block of the first file. In this application, the new inode may be referred to as a first inode, and the new data block may be referred to as a first data block. In the new image, data blocks of the first file may include the new data block and a data block of the first file in the first part. Data of the data block of the first file in the first part may be different from data of a data block of the first file in the original image. In this application, the data block of the first file in the first part may be referred to as a second data block, and the data block of the first file in the original image may be referred to as a third data block. Pointers in the new inode may point to the new data block and the data block of the first file in the first part.

An inode of the first file in the first part of the new image is invalid.

As shown in FIG. 6, based on a device mapper mechanism, a delta device for storing differential data may be obtained by using a virtual block device abstracted from a new image and a physical block device for storing an original image. The delta device may be a block device. The delta device and the virtual block device abstracted from the new image may have a same size. How to generate a delta device is described in subsequent embodiments, and details are not described herein. The differential data stored in the delta device may include two parts: differential data A and differential data B, where the differential data A is differential data (namely, Δdata 3 and a large quantity of 0s) between the first part of the new image and the original image, and the differential data B is the second part (namely, the inode 3' and the data 3-2') of the new image. When a patch is generated based on the differential data, zero differential data is efficiently compressed. In other words, a size of the patch may be mainly determined by a size of non-zero differential data.

It can be learned that, because the disk layout of the first part of the new image is the same as the disk layout of the original image, there is little or even no non-zero differential data (for example, Δdata 3) between the first part and the original image, a large amount of zero differential data occurs, and the patch is quite small.

Manner 2: Add a new inode and a new data block of the file 3 to an end of the original image, to obtain a new image.

Figure 7:
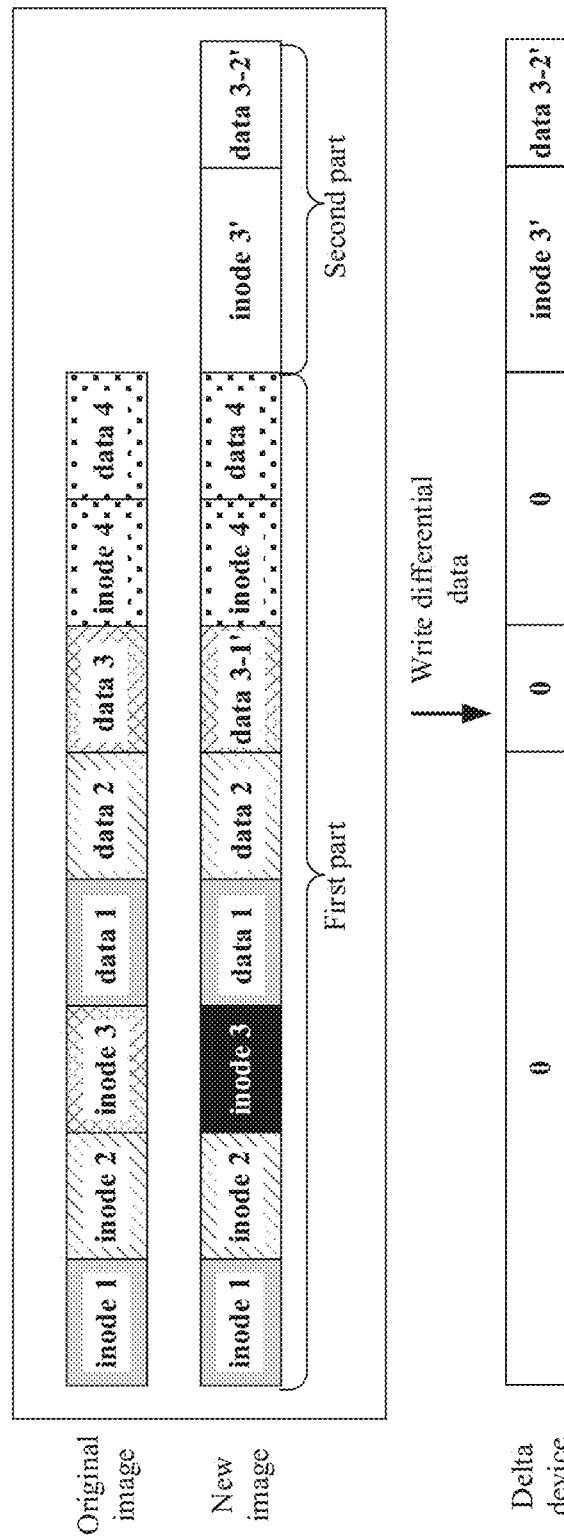
FIG. 7 is a schematic diagram of another manner of generating a new image based on the original image shown in FIG. 5.

As shown in FIG. 7, different from Manner 1, data of the data block data 3-1' of the file 3 in the first part may be the same as data of the data block data 3 of the file 3 in the original image.

Usually, Manner 2 may be used for the following scenario: Data of the file 3 is modified, the data block of the file 3 in the original image is insufficient to carry data of the changed file 3, and the inode of the file 3 also becomes larger.

For Manner 2, the new image may generally include two parts: a first part and a second part, the second part is appended to an end of the first part, a disk layout of the first part is the same as a disk layout of the original image, and the second part may include a new inode and a new data block of the first file. In this application, the new inode may be referred to as a first inode, and the new data block may be referred to as a first data block. In the new image, data blocks of the first file may include the new data block and a data block of the first file in the first part. Data of the data block of the first file in the first part may be the same as data of a data block of the first file in the original image. In this application, the data block of the first file in the first part may be referred to as a second data block, and the data block of the first file in the original image may be referred to as a third data block. Pointers in the new inode may point to the new data block and the data block of the first file in the first part.

An inode of the first file in the first part of the new image is invalid.

As shown in FIG. 7, based on a device mapper mechanism, a delta device for storing differential data may be obtained by using a virtual block device abstracted from a new image and a physical block device for storing an original image. Other disk blocks on the delta device that have no data are all filled with zero. Non-zero differential data stored in the delta device may include an inode 3' and data 3-2'. It can be learned through comparison with Manner 1 that, because the data of the data 3-1' is the same as the data of the data 3, the non-zero differential data is further reduced, and the patch is smaller.

Manner 3: Add a new inode and full data of the file 3 to an end of the original image to obtain a new image. Manner 3 may be applied to a non-compression scenario. In other words, data in a data block of a file is not compressed.

Figure 8:
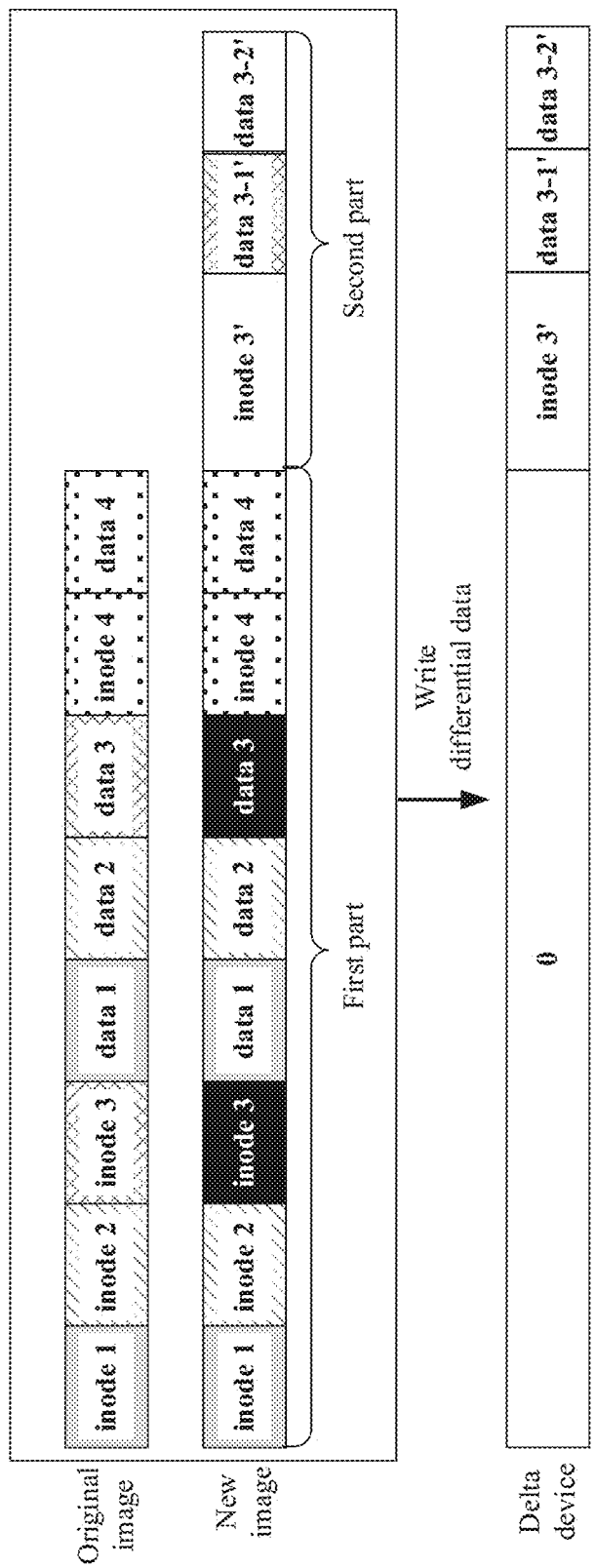
FIG. 8 is a schematic diagram of still another manner of generating a new image based on the original image shown in FIG. 5.

As shown in FIG. 8, the new image may include a first part and a second part. A disk layout of the first part is the same as a disk layout of the original image. The second part is appended at an end of the first part. The second part may include a new inode (namely, inode 3'), a data block data 3-1', and a data block data 3-2'. The data block data 3-1' and the data block data 3-2' jointly store the full data of the changed first file. The data block data 3-2' may be a new data block of the file 3. Data of the data block data 3-1' and data of the data block data 3 of the file 3 in the original image may be the same or different.

The new inode may include new description information, such as a creation time, of the file 3 and a pointer pointing to the data block of the file 3. The inode (the inode 3) of the file 3 in the first part is invalid. Herein, "invalid" means that an attribute of the changed file 3 (such as the creation time of the file 3) and the pointer pointing to the data block of the file 3 are not determined based on the inode 3 in the new image. The data block data 3 of the file 3 in the first part is invalid. Herein, "invalid" means that data of the changed file 3 is not obtained from the data 3 in the new image.

Usually, Manner 3 may be used for the following scenario: Data in a data block is not compressed. The data block of the file 3 in the original image is insufficient to carry data of the changed file 3, and the inode of the file 3 also becomes larger.

For Manner 3, generally, the new image may include two parts: a first part and a second part, the second part is appended to an end of the first part, a disk layout of the first part is the same as a disk layout of the original image, and the second part may include a new inode of the first file and a new data block of the first file. In this application, the new inode may be referred to as a first inode, and the new data block may be referred to as a fourth data block. The new data block of the first file may be a group of consecutive disk blocks, and may be used to store full data of the changed first file. A pointer in the first inode may point to the fourth data block.

Data of some of new data blocks of the first file may be the same as data of data blocks of the first file in the first part of the new image. For example, the data of the data 3-1' and the data of the data 3 may be the same.

An inode and a data block of the first file in the first part of the new image are invalid. The pointer in the first inode points to the fourth data block instead of pointing to the data block of the first file in the first part. This may also reflect that the data block of the first file in the first part is invalid.

As shown in FIG. 8, based on a device mapper mechanism, a delta device for storing differential data may be obtained by using a virtual block device abstracted from a new image and a physical block device for storing an original image. The differential data stored in the delta device may include two parts: differential data A and differential data B, where the differential data A is differential data (namely, a large quantity of 0s) between the first part of the new image and the original image, and the differential data B is the second part (namely, the inode 3', the data 3-1', and the data 3-2) of the new image. When a patch is generated based on the differential data, zero differential data is efficiently compressed. In other words, a size of the patch may be mainly determined by a size of non-zero differential data.

It can be learned that, because the disk layout of the first part of the new image is the same as the disk layout of the original image, there is little or even no non-zero differential data between the first part and the original image, a large amount of zero differential data occurs, and the patch is quite small.

Manner 4: Add a new inode of the file 3 to an end of the original image to obtain a new image.

Figure 9:
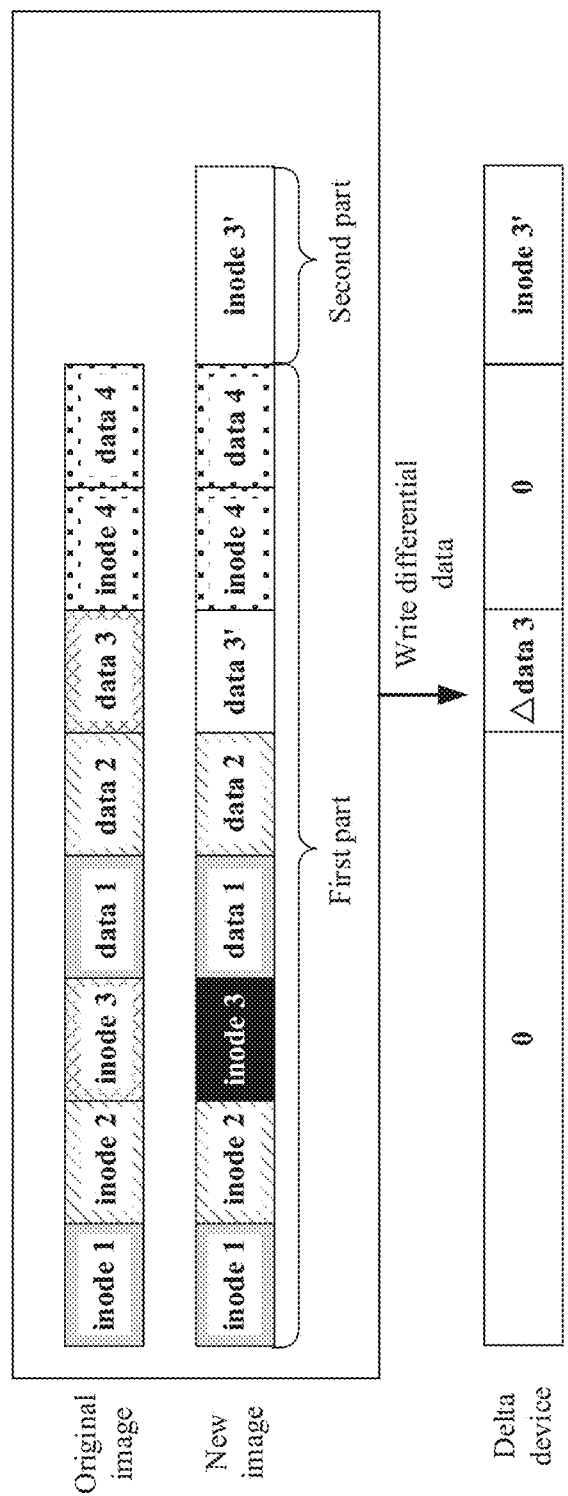
FIG. 9 is a schematic diagram of still another manner of generating a new image based on the original image shown in FIG. 5.

As shown in FIG. 9, the new image may include a first part and a second part. A disk layout of the first part is the same as a disk layout of the original image. The second part is appended at an end of the first part. The second part may include only the new inode (namely, an inode 3') of the file 3. In the new image, a data block of the file 3 is a data block data 3' of the file 3 in the first part. Data of the data block data 3' and data of the data block data 3 of the file 3 in the original image may be the same or different.

The new inode may include new description information, such as a creation time, of the file 3 and a pointer pointing to the data block of the file 3. The inode (namely, the inode 3) of the file 3 in the first part is invalid. Herein, "invalid" means that an attribute of the changed file 3 (such as the creation time of the file 3) and the pointer pointing to the data 3' are not determined based on the inode 3 in the new image.

Usually, Manner 4 may be used for the following scenario: Description information of the file 3 changes, and the inode of the file 3 in the original image is insufficient to carry the description information of the changed file 3 and pointer information of the data block of the file 3. The data of the file 3 does not change, or the data block of the file 3 in the original image can carry data of the changed file 3. If the data of the file 3 does not change, data of a data block of the file 3 in the first part of the new image is the same as the data of the data block of the file 3 in the original image. If the data of the file 3 changes, data of a data block of the file 3 in the first part of the new image is different from the data of the data block of the file 3 in the original image.

For Manner 4, generally, the new image may include two parts: a first part and a second part, the second part is appended to an end of the first part, a disk layout of the first part is the same as a disk layout of the original image, and the second part may include a new inode of the first file. In this application, the new inode may be referred to as a first inode. A pointer in the first inode may point to a data block of the first file in the first part. In the new image, a data block of the first file is the data block of the first file in the first part. Data of the data block and data of a data block of the first file in the original image may be the same or different. In this application, the data block of the first file in the first part may be referred to as a second data block, and the data block of the first file in the original image may be referred to as a third data block.

An inode of the first file in the first part of the new image is invalid.

As shown in FIG. 9, based on a device mapper mechanism, a delta device for storing differential data may be obtained by using a virtual block device abstracted from a new image and a physical block device for storing an original image. The differential data stored in the delta device may include two parts: differential data A and differential data B, where the differential data A is differential data (namely, Δdata 3 and a large quantity of 0s) between the first part of the new image and the original image, and the differential data B is the second part (namely, the inode 3') of the new image. When a patch is generated based on the differential data, zero differential data is efficiently compressed. In other words, a size of the patch may be mainly determined by a size of non-zero differential data.

It can be learned that, because the disk layout of the first part of the new image is the same as the disk layout of the original image, there is little or even no non-zero differential data (for example, Δdata 3) between the first part and the original image, a large amount of zero differential data occurs, and the patch is quite small.

Manner 5. Add a new data block of the file 3 to an end of the original image, to obtain a new image.

Figure 10:
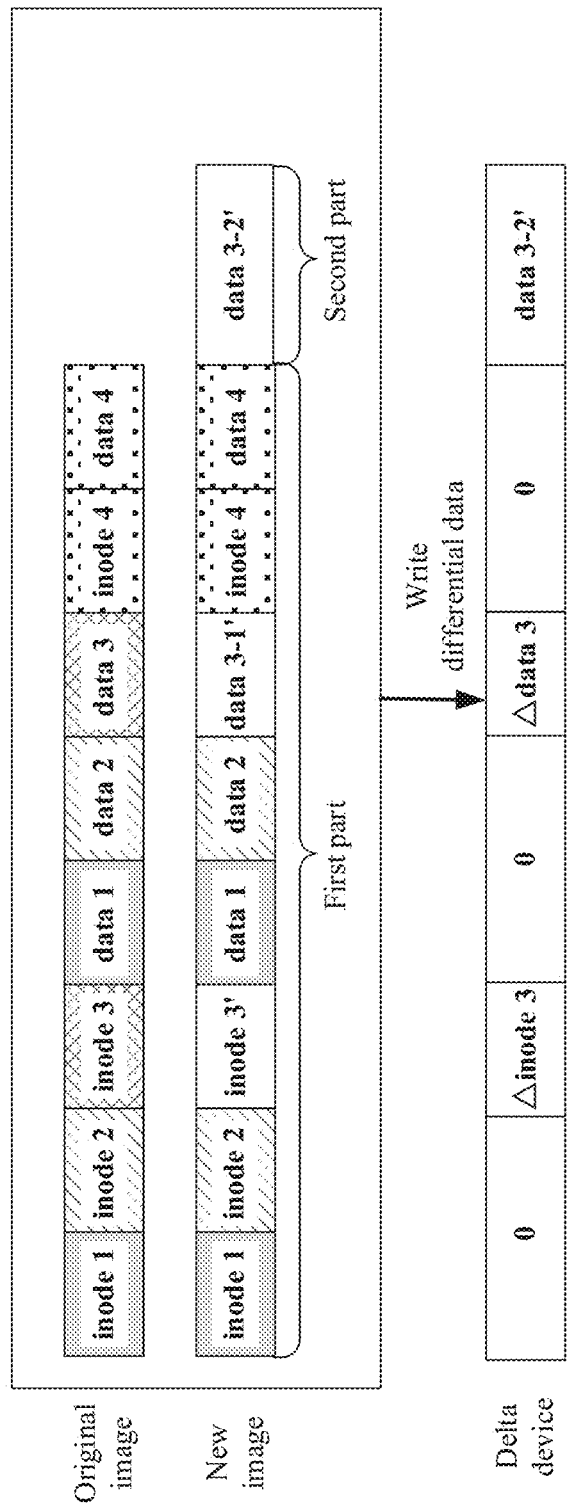
FIG. 10 is a schematic diagram of still another manner of generating a new image based on the original image shown in FIG. 5.

As shown in FIG. 10, the new image may include a first part and a second part. A disk layout of the first part is the same as a disk layout of the original image. The second part is appended at an end of the first part. The second part may include only a new data block data 3-2' of the file 3. In the new image, data blocks of the file 3 include the new data block data 3-2' and a data block data 3-1' of the file 3 in the first part. Data of the data block data 3-1' and data of the data block data 3 of the file 3 in the original image may be the same or different. In the new image, an inode of the file 3 may be an inode of the file 3 in the first part. The inode may include new description information, such as a creation time, of the file 3 and pointers pointing to the data 3-1' and the data 3-2'.

Usually, Manner 5 may be used for the following scenario: Data of the file 3 is modified, and the data block of the file 3 in the original image is insufficient to carry data of the changed file 3, but the inode of the file 3 does not become larger.

For Manner 5, generally, the new image may include two parts: a first part and a second part, the second part is appended to an end of the first part, a disk layout of the first part is the same as a disk layout of the original image, and the second part may include a new data block of the first file. In the new image, an inode of the first file may be an inode of the first file in the first part. The inode may include a pointer of the new data block of the first file and a pointer of a data block of the first file in the first part. Data of the data block of the first file in the first part and data of a data block of the first file in the original image may be the same or different. In this application, the data block of the first file in the first part may be referred to as a second data block, and the data block of the first file in the original image may be referred to as a third data block.

As shown in FIG. 10, based on a device mapper mechanism, a delta device for storing differential data may be obtained by using a virtual block device abstracted from a new image and a physical block device for storing an original image. The differential data stored in the delta device may include two parts, differential data A and differential data B, where the differential data A is differential data (namely, Δinode 3, Δdata 3, and a large quantity of 0s) between the first part of the new image and the original image, and the differential data B is the second part (namely, the data 3-2') of the new image. When a patch is generated based on the differential data, zero differential data is efficiently compressed. In other words, a size of the patch may be mainly determined by a size of non-zero differential data.

It can be learned that, because the disk layout of the first part of the new image is the same as the disk layout of the original image, there is little or even no non-zero differential data (for example, Δinode 3 and Δdata 3) between the first part and the original image, a large amount of zero differential data occurs, and the patch is quite small.

Figure 11:
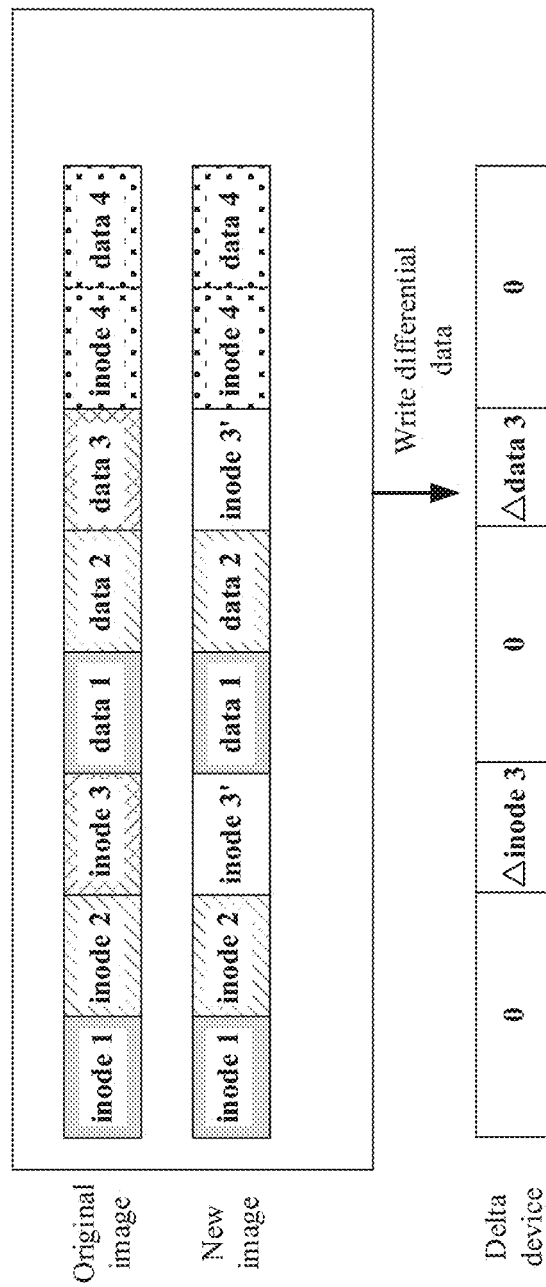
FIG. 11 is a schematic diagram of still another manner of generating a new image based on the original image shown in FIG. 5.

In addition, as illustrated in FIG. 11, in a possible case, data of the file 3 changes, but the data block of the file 3 in the original image is sufficient to carry data of the changed file 3, and the inode of the file 3 does not become larger. In this case, because the disk layout of the new image is the same as the overall disk layout of the original image, there is little non-zero differential data.

In the foregoing content of Embodiment 1, that the disk layout of the first part of the new image is consistent with the disk layout of the original image means that for a file in a software package, a block number of a data block and an inode number of an inode that are of the file in the first part are respectively the same as a block number of a data block and an inode number of an inode that are of the file in the original image.

Second, how to obtain a delta device by using a new image and an original image is described.

Figure 12:
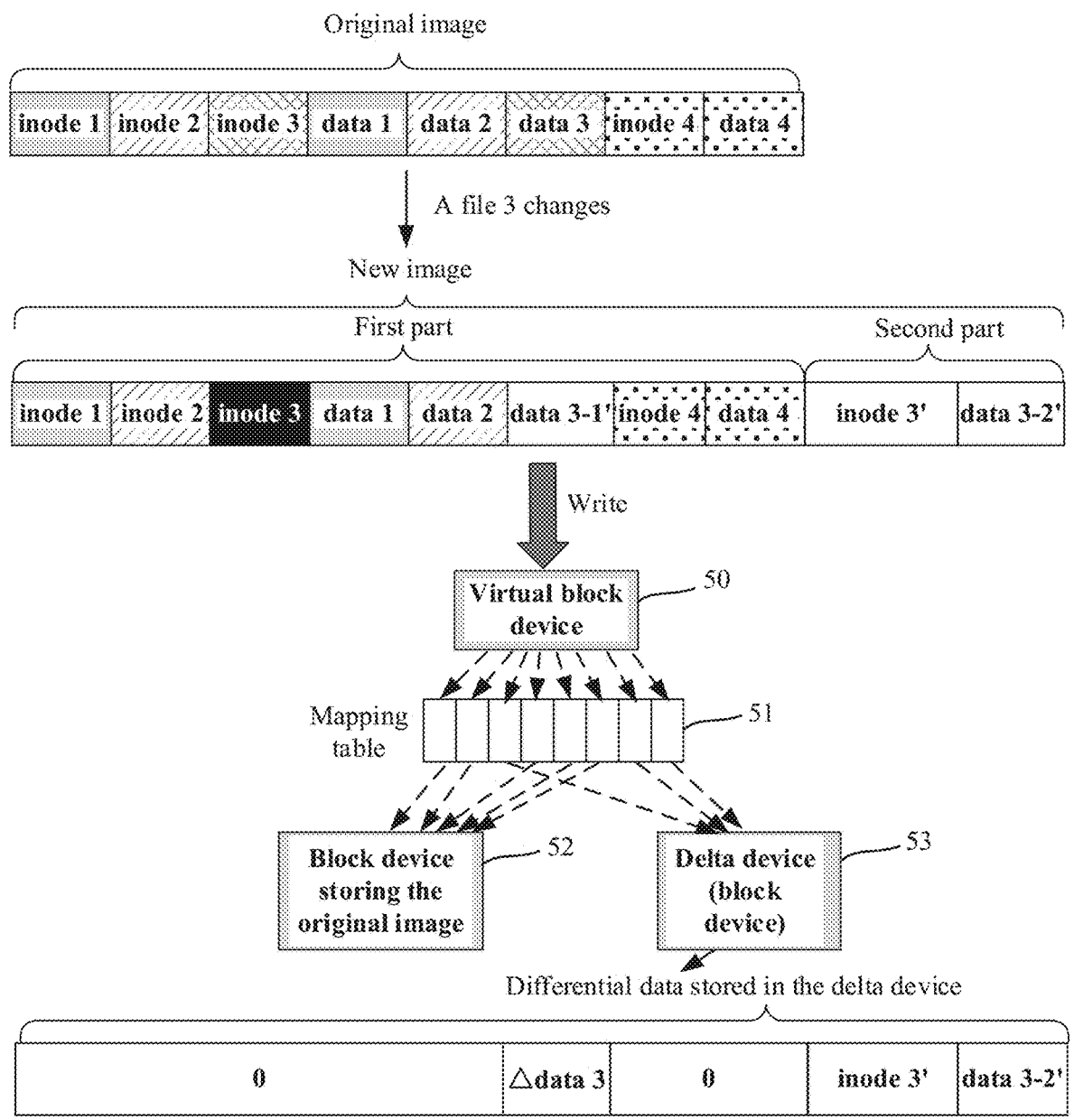
FIG. 12 is a schematic diagram of generating a delta device according to Embodiment 1.

As shown in FIG. 12, based on a device mapper mechanism, a delta device 53 for storing differential data may be obtained by using a virtual block device 50 abstracted from a new image and a physical block device 52 for storing an original image. The physical block device 52 for storing the original image may be mounted in a read-only manner.

A device mapper is a framework provided by a Linux kernel to map a block device to a virtual block device. The device mapper supports many advanced volume management technologies. As a mapping technical framework of a Linux block device, the device mapper provides a logic device to the outside. The device mapper includes three important concepts: a mapped device (mapped device), a mapping table (map table), and a target device (target device). The mapped device is a logic device provided to the outside, and the mapped device needs to be mapped to the target device. The mapping table stores a mapping relationship from the mapped device to the target device. The target device may be a physical device or a mapped device. If the target device is a mapped device, nested mapping occurs. Simply, the device mapper provides a virtual block device to the outside for use, and the virtual block device may find a corresponding address by using the mapping table. The address may point to the physical device or the virtual block device.

In FIG. 12, the block device 52 for storing the original image and the delta device 53 for storing differential data may be target devices of the virtual block device 50. A mapping table 51 may be used to store a mapping relationship from the virtual block device 50 to the block device 52 and the delta device 53. The delta device 53 may be a physical block device whose size may be equal to a size of the virtual block device 50. During initial creation, data stored in the delta device 53 may be a default value, for example, 0.

The new image may be written into the virtual block device 50. The new image may be written into the virtual block device 50 in the following two manners: Manner 1: When the virtual block device 50 is read-only, the new image may be written based on a write interface of a disk block. Manner 2. When the virtual block device 50 is writable, the virtual block device 50 may be mounted, and then the new image is written based on a file read/write interface.

The differential data on the delta device 53 may be determined by comparing the virtual block device 50 and the block device 52 disk block by disk block. Two disk blocks that are respectively located in the virtual block device 50 and the block device 52 and that have a same block number may be referred to as a first disk block and a second disk block respectively. Differential data between the two disk blocks may be written into a third disk block. The third disk block is located in the delta device 53, and has a same block number as the first disk block. For example, Δdata 3 written into the delta device 53 is differential data between data 3-1' on the virtual block device 50 and data 3 on the block device 52.

It should be understood that, when data of the first disk block is the same as data of the first disk block, the differential data written into the third disk block is 0. For example, differential data between an inode 1 on the virtual block device 50 and an inode 1 on the block device 52 is 0.

Finally, the differential data stored in the delta device 53 may be packaged into a patch, and the patch may be used in an electronic device (for example, a mobile phone) to upgrade software of an old version. Zero differential data may be efficiently compressed to reduce a size of the patch. The size of the patch is mainly determined by a data amount of non-zero differential data.

The mapping table 51 may record the mapping relationship from the virtual block device 50 to the block device 52 and the delta device 53. When the virtual block device 50 and the block device 52 are compared disk block by disk block, the mapping relationship may be determined, and further, the mapping table 51 is determined based on the mapping relationship. For example, as shown in FIG. 12, the mapping table 51 may record the following mapping relationship: The inode 1 in the virtual block device 50 is mapped to the inode 1 in the block device 52, the data 3-1' in the virtual block device 50 is mapped to the data 3 in the block device 52 and the Δdata 3 in the delta device 53, an inode 3' in the virtual block device 50 is mapped to data 3-2' in the delta device 53, and the like. In other words, the mapping table 51 may specifically record a mapping relationship from an inode in the virtual block device 50 to an inode in the block device 52 and an inode in the delta device 53, and a mapping relationship from a data block in the virtual block device 50 to a data block in the block device 52 and a data block in the delta device 53. The mapping table 51 may be carried in the patch, so that after downloading the patch, the electronic device merges the patch and the original image into a new image based on the mapping table 51.

The mapping table 51 may not record a mapping relationship from an invalid data block and/or an invalid inode in the virtual block device 50 to the block device 52 and the delta device 53. For example, the mapping table may record a mapping relationship from an inode 3 in the virtual block device 50 to the block device 52 and the delta device 53.

Figure 13:
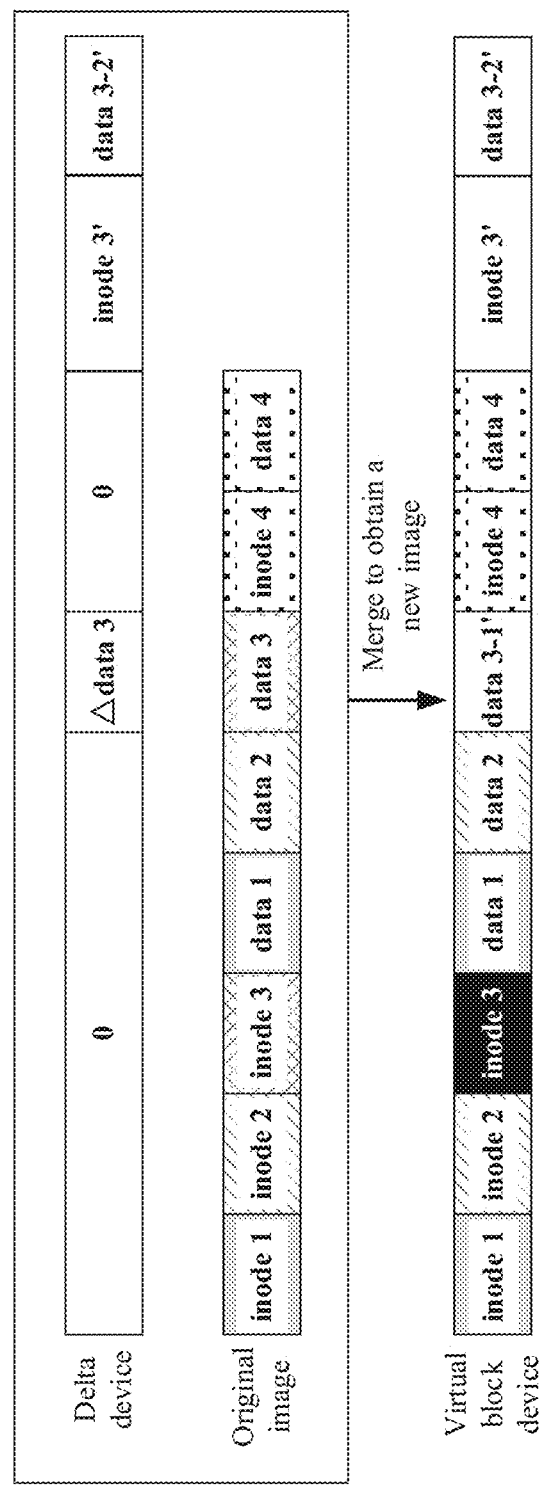
FIG. 13 is a schematic diagram of merging a delta device and an original image into a virtual block device by an electronic device.

On an electronic device side, the electronic device may write differential data, for example, the data 3, the inode 3', and the data 3-2', included in the patch and a large quantity of 0s into the delta device. Then, as shown in FIG. 13, the electronic device may map the delta device storing the differential data and the block device storing the original image to a virtual block device based on the mapping table, where data stored in the virtual block device is the new image. Finally, the electronic device may mount the virtual block device, so that the new image is accessed. In a read-only scenario, for example, if the new image is a system image, the electronic device may mount and write the virtual block device in a read-only manner.

The differential data in the patch may include the following two parts of data: a second part of the new image and differential data between a first part of the new image and the original image. Because a disk layout of the first part of the new image is the same as a disk layout of the original image, there is little non-zero differential data between the first part and the original image, and the patch is small. In other words, the differential data reflects only a change of an inode and/or data of a first file, and does not involve other changes. However, in the conventional technology, inflation of an inode and/or a data block of a changed file causes an overall offset of a new image relative to an original image in a disk layout. As a result, a large amount of non-zero differential data is included in a patch, and the patch is large.

In addition, this application may also be applied to a read-only file system. In other words, an original image may be a read-only file system image. In the conventional technology, an image is updated based on a file read/write interface. The file read/write interface is no longer applicable to an original image of the read-only file system. However, in this application, a disk block-based write interface (for example, a memcopy interface) is used to update an inode, a data block, and a dentry of a first file in the original image, to obtain a new image, and therefore this application is applicable to the read-only file system.

Finally, an overall procedure of the patching method provided in Embodiment 1 is described.

Figure 14:
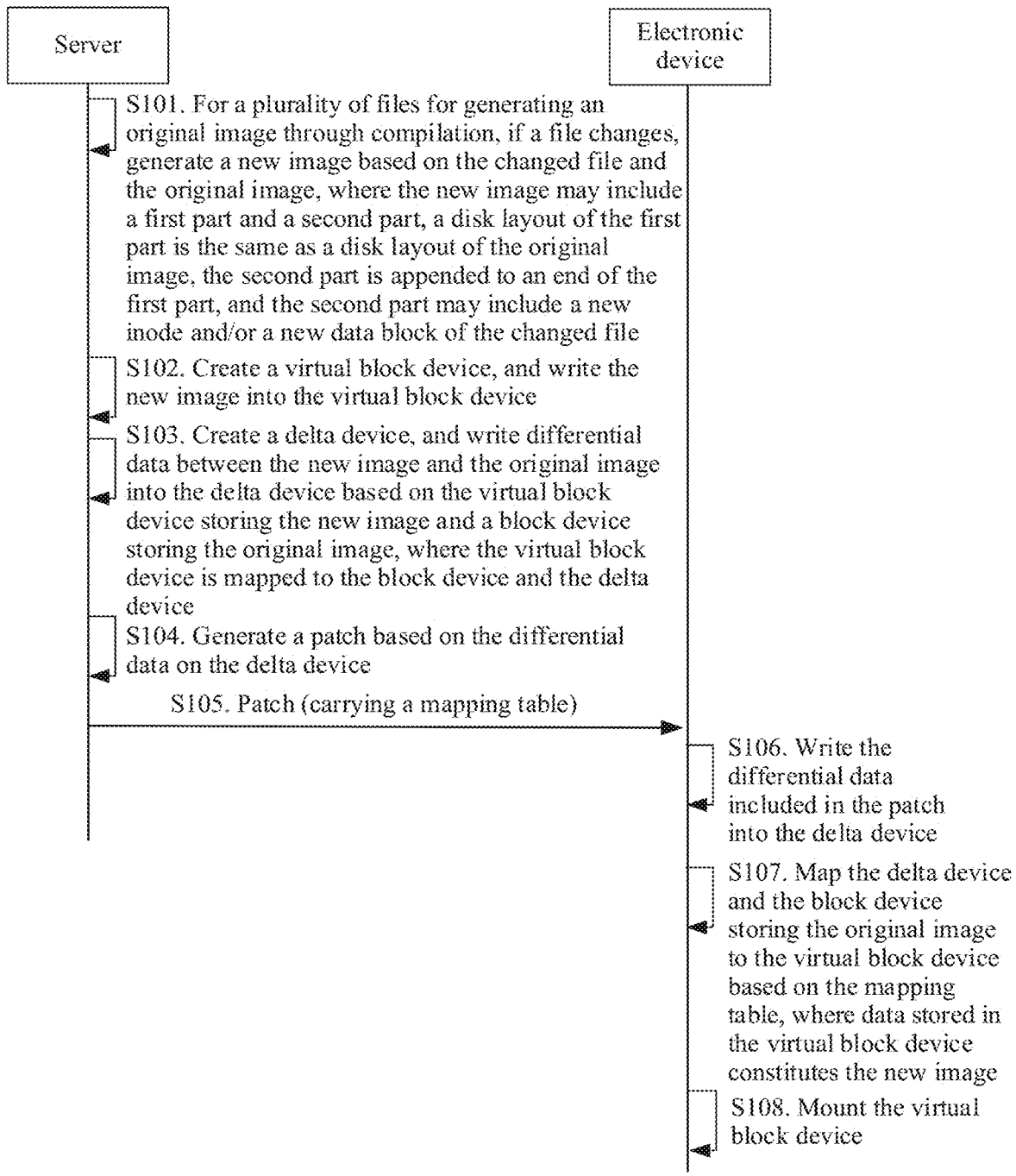
FIG. 14 is a schematic flowchart of a patching method according to Embodiment 1.

FIG. 14 shows an overall procedure of a patching method according to Embodiment 1. S101 to S105 mainly describe steps on a server side, and S105 to S109 mainly describe steps on an electronic device side. As shown in FIG. 14, the method may include the following steps.

S101. For a plurality of files for generating an original image through compilation, if a file in the plurality of files changes, a server may generate a new image based on the changed file and the original image. The changed file may be referred to as a first file. The first file may be one or more files. Herein, the file may be a common file, such as a header file *.h, a C code source file *.c, or a C++ code source file *.cpp, or the file may be a directory file, a symbol link file, or the like.

The new image may include a first part and a second part, a disk layout of the first part may be the same as a disk layout of the original image, the second part may be appended to an end of the first part, and the second part may include a new inode and/or a new data block of the changed first file. For the disk layout of the original image, refer to the foregoing content. Details are not described herein again.

A procedure of generating the new image based on the first file and the original image is described in subsequent content. Details are not described herein.

S102. The server may create a virtual block device, and write the new image into the virtual block device.

Specifically, the following two manners may be used to write the new image into the virtual block device but do not constitute a limitation: Manner 1. When the virtual block device is writable, the server may mount the virtual block device, and then write the new image based on a file read/write interface. Manner 2: When the virtual block device is read-only, the server may write the new image based on a write interface of a disk block.

S103. The server may create a delta device. Then, the server may write differential data between the new image and the original image into the delta device based on the virtual block device into which the new image is written and a block device storing the original image.

Based on a device mapper mechanism, the virtual block device may be mapped to the block device storing the original image and the delta device storing the differential data. In other words, the virtual block device may be a mapped device, and the block device storing the original image and the delta device storing the differential data may be target devices of the virtual block device. A mapping relationship from the mapped device to the target devices may be recorded in a mapping table.

For how to obtain the delta device based on the virtual block device into which the new image is written and the block device storing the original image, refer to the foregoing content. Details are not described herein again.

S104. The server may generate a patch based on the differential data on the delta device.

Specifically, the differential data in the patch may include the following two parts of data: the second part of the new image and differential data between the first part of the new image and the original image. When the patch is generated based on the differential data, zero differential data is efficiently compressed. In other words, a size of the patch may be mainly determined by a size of non-zero differential data. Because the disk layout of the first part of the new image is the same as the disk layout of the original image, there is little non-zero differential data between the first part and the original image, and the patch is small. In other words, the differential data reflects only a change of an inode and/or a data of the first file, and does not involve other changes.

The patch may also carry a mapping table. The mapping table may be used to indicate a mapping relationship from the delta device and the block device storing the original image to the virtual block device. In this way, an electronic device may map the delta device storing the differential data and the block device storing the original image to the virtual block device based on the mapping table, to obtain the new image stored in the virtual block device.

S105. The server may send the patch to the electronic device. Correspondingly, the electronic device may receive the patch sent by the server.

Specifically, after generating the patch, the server may actively push the patch to the electronic device. Optionally, the electronic device may make, to the server, a request for downloading the patch.

S106. After receiving the patch, the electronic device may write the differential data included in the patch into the delta device.

Specifically, after receiving the patch, the electronic device may store the patch in a temporary directory, and decompress the patch. Then, the electronic device may write the decompressed patch into a patch partition, and mount the patch partition. Finally, the differential data stored in the patch partition is read, and then the data on the entire patch partition is written into the delta device.

S107. The electronic device may map the delta device and the block device storing the original image to the virtual block device based on the mapping table. Data stored in the virtual block device constitutes the new image.

S108. The electronic device may mount the virtual block device.

Specifically, the electronic device mounts the virtual block device, so that the new image stored in the virtual block device is accessed. If the new image is a system image, the electronic device may mount the virtual block device in a read-only manner.

S109. The electronic device may read and install the new image.

It can be learned that, the differential data in the patch includes the following two parts of data: the second part of the new image and the differential data between the first part of the new image and the original image. Because the disk layout of the first part of the new image is the same as the disk layout of the original image, there is little non-zero differential data between the first part and the original image, and the patch is small. In other words, the differential data reflects only the change of the inode and/or the data of the first file, and does not involve other changes.

For adding a new inode and/or a new data block of the first file to the disk layout of the original image to obtain the new image, the foregoing content describes several manners in detail. For details, refer to FIG. 6 to FIG. 11. Details are not described herein again.

Figure 15:
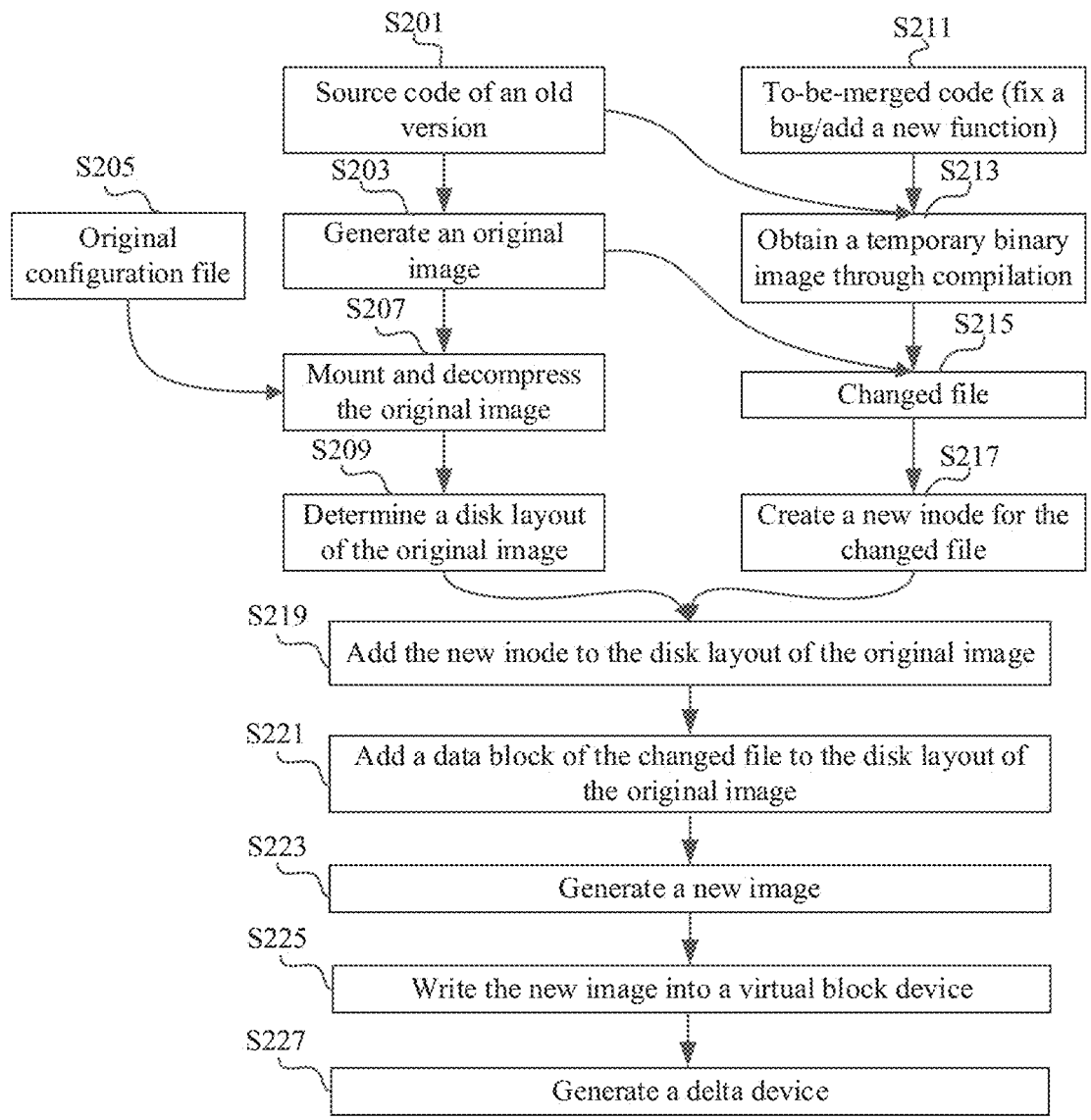
FIG. 15 is a schematic diagram of a specific procedure of generating a delta device on a server side according to Embodiment 1.

FIG. 15 shows a specific procedure of generating a delta device on a server side.

S201. Obtain source code of an old version, where the source code includes a plurality of files, and an original image may be generated by compiling the plurality of files.

S203. Generate the original image based on the source code of the old version. The original image may be an image of a read-only compressed file system, for example, an extendable read-only file system (extendable read-only file system, EROFS) image. This is not limited, and the original image may be alternatively an image of a non-compression system, or the original image may be an image of a writable file system.

S205. Obtain an original configuration file, where the original configuration file may include file attributes such as a file type and permission, and configurable attributes such as SElinux. The original configuration file may be obtained in the process of generating the original image based on the source code of the old version. To be specific, the file attributes such as a file type and permission and SElinux configuration information of each file may be extracted in the process of generating the original image by compiling the plurality of files (including a source code file and another configuration file), and the extracted information may be stored in the original configuration file. The original configuration file may be alternatively extracted from the original image. Specifically, after the original image is mounted, the file attributes such as a file type and permission and the SElinux configuration information of the plurality of files for generating the original image through compilation may be read, and the read information may be stored in the original configuration file.

S207. Mount and decompress the original image, to obtain the plurality of files for generating the original image through compilation.

S209. Determine a disk layout of the original image. The disk layout of the original image may be determined by reproducing the process of generating the original image by compiling the plurality of files. Optionally, the disk layout of the original image may be included in the original configuration file, or may be read from the original configuration file obtained in S205.

S211. Obtain to-be-merged code. The to-be-merged code may be used to fix a software bug or may be used to add a new product function.

S213. Compile the source code of the old version and the to-be-merged code to generate a temporary binary image.

S215. Compare the temporary binary image generated in S213 and the original image to determine a changed file in the plurality of files. The changed file may be referred to as a first file. The first file may be a file whose data changes, or may be a file whose description information (such as a file size, a file type, a file creation time, or a file modification time) changes.

S217. Create a new inode for the first file. The new inode includes description information of the changed first file and a pointer of a data block of the changed first file.

S219. Add the new inode of the first file to the disk layout of the original image. Specifically, the inode of the first file may be appended to an end of the original image. Optionally, when the inode of the first file does not become significantly larger, the inode of the first file may be inserted into an inode position of the first file in the original image. Herein. "not become significantly larger" means that a disk block occupied by an inode of the first file in the original image is sufficient to carry the new inode of the first file.

For specific implementation of adding the new inode of the first file to the disk layout of the original image, refer to related content in FIG. 6 to FIG. 11. Details are not described herein again.

Specifically, after the new inode of the first file is added to the disk layout of the original image, a dentry of the first file may be updated. The updated dentry includes an inode number of the new inode of the first file and a file name and a file type of the changed first file.

S221. Add a data block of the changed first file to the disk layout of the original image.

For specific implementation of adding the data block of the changed first file to the disk layout of the original image, refer to related content in FIG. 6 to FIG. 11. Details are not described herein again.

Specifically, after the data block of the changed first file is added to the disk layout of the original image, the new inode of the first file includes a pointer of the data block.

S223. After S219 and S221, determine a disk layout of anew image based on the first file and the disk layout of the original image, to finally generate the new image. For description of the new image, refer to the foregoing content. Details are not described herein again.

S225. After the new image is generated, write the new image into a virtual block device.

S227. Generate a delta device. Specifically, during initial creation, data stored in the delta device may be a default value, for example, 0. Then, differential data between the new image and the original image may be written into the delta device based on a mapping relationship from the virtual block device storing the new image to a block device storing the original image and the delta device.

Specifically, the differential data may be written into the delta device by using an interface of a write raw device (a device not mounted in a file system). In comparison with conventional file reading/writing, an original image 2002 is a read-only file system, and is inapplicable to a file-based write interface. Therefore, to write the differential data into the delta device, the interface of the write raw device may be used, but this is not a limitation. The interface of the write raw device may be a block-based write interface, for example, a memcopy interface.

For a file that changes in software of the old version, a new inode and/or a data block of the file is appended to an end of the disk layout of the original image, to update the file in the disk layout of the original image to form a new disk layout. A dentry of the changed file is modified accordingly, and an inode in the modified dentry points to the new mode of the changed file. In this way, the file can be updated without changing the disk layout of the original image, so that little differential data is generated and a patch is small.

Embodiment 2

In this embodiment, a size of a delta device and a size of a block device storing an original image may be the same. To achieve this objective, a disk block configured for check data in the delta device may be used to carry a part of differential data, and the part of differential data is a second part of a new image, namely, an inode and/or a data block appended to an end of the original image. The block device storing the original image may further store check data of the original image. The delta device storing differential data may further store check data of the differential data. However, the delta device stores little differential data (mainly non-zero differential data) that needs to be checked, and therefore, little check data is required, and the disk block used to store the check data is usually not fully occupied by the check data.

In other words, the part of differential data (namely, the second part of the new image) may be written by using occupied bits of the check data on the delta device, without a need to additionally allocate a disk block at a tail of the delta device to write the part of differential data, so that the sizes of the delta device and the block device that stores the original image can be the same. Therefore, a patch is matched with the original image.

Figure 16:
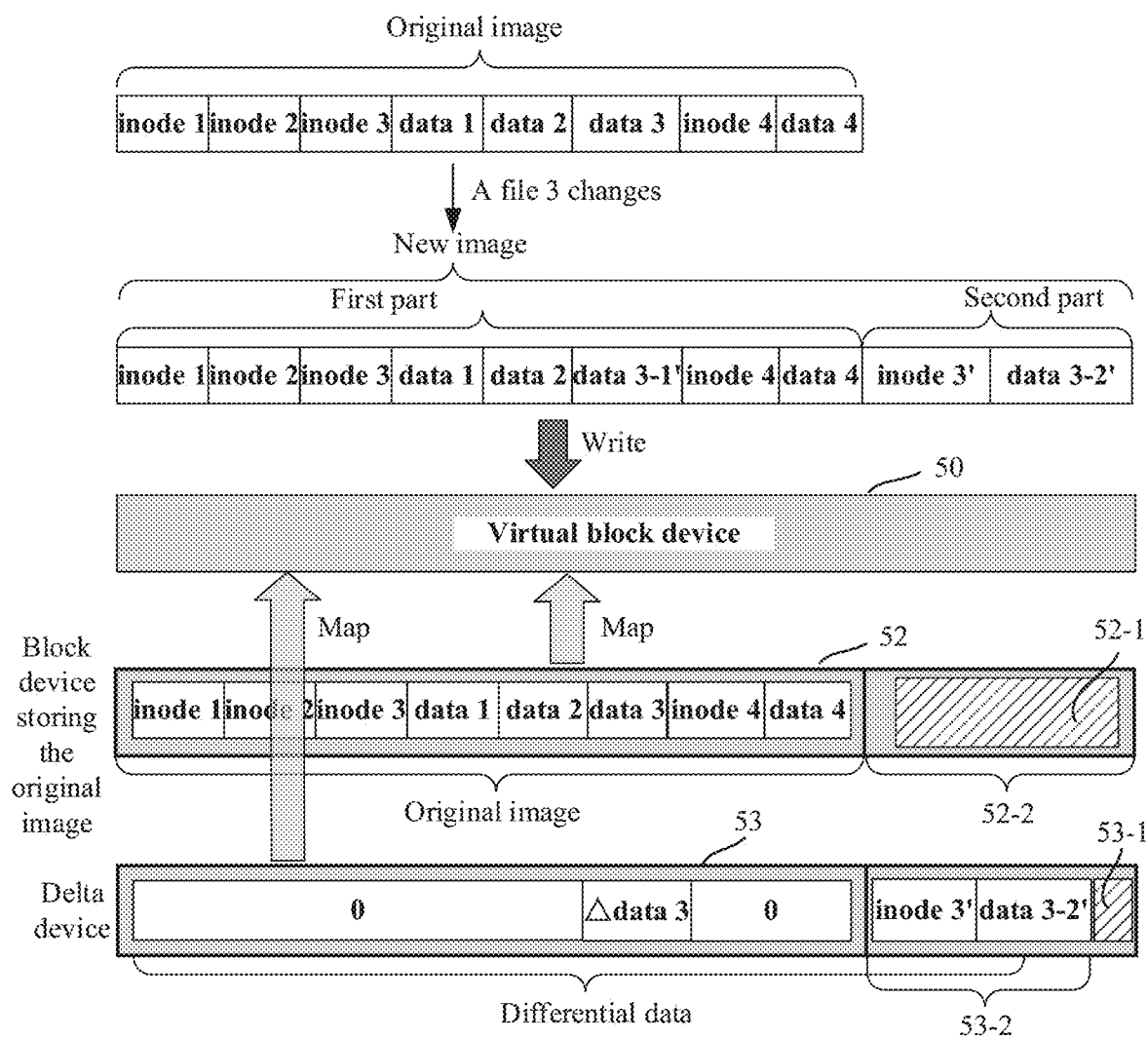
FIG. 16 is a schematic diagram of generating a delta device according to Embodiment 2.

FIG. 16 illustrates a mapping relationship from a virtual block device to a delta device and a block device storing an original image. Assuming that a file 3 changes, a new inode (namely, an inode 3') and a new data block (namely, data 3-2') need to be appended to an end of the original image to obtain a new image. Details are shown in FIG. 16.

The new image is written into a virtual block device 50. The new image may include a first part and a second part, a disk layout of the first part may be the same as a disk layout of the original image, the second part may be appended to an end of the first part, and the second part may include a new inode and/or a new data block of a changed first file. For adding the new inode and/or the new data block of the first file to the disk layout of the original image to obtain the new image, the foregoing content describes several manners in detail. For details, refer to FIG. 6 to FIG. 11. Details are not described herein again.

The virtual block device 50 may be mapped to a block device 52 and a delta device 53. The block device 52 may store the original image and check data 52-1. The check data 52-1 may be used to check the original image. A disk block 52-2 is a disk block configured for the check data 52-1. The delta device 53 may store differential data and check data 53-1. The check data 53-1 may be used to check the differential data. A part of differential data (for example, the inode 3' and the data 3-2') in the differential data may be stored in a disk block 53-2. The disk block 53-2 is a disk block configured for the check data. The disk block may be referred to as a first disk block.

FIG. 16 shows only one manner of generating a new image based on an original image (refer to FIG. 6). For the other manners shown in FIG. 7 to FIG. 11, a part of differential data stored in the disk block 53-2 may be different, and the part of differential data is the second part of the new image. For example, for differential data shown in FIG. 9, a part of differential data stored in the disk block 53-2 is the inode 3'. For another example, for differential data shown in FIG. 10, a part of differential data stored in the disk block 53-2 is the data 3-2'.

On an electronic device side, when a virtual block device is accessed, the electronic device may separately check two devices (namely, a delta device and a block device storing an original image) mapped to the virtual block device.

For an overall procedure of a patching method provided in Embodiment 2, refer to the overall procedure of the patching method provided in Embodiment 1. Different from Embodiment 1, a part of differential data (namely, a second part of a new image) in a patch may be stored in a disk block configured for check data in the patch.

Figure 17:
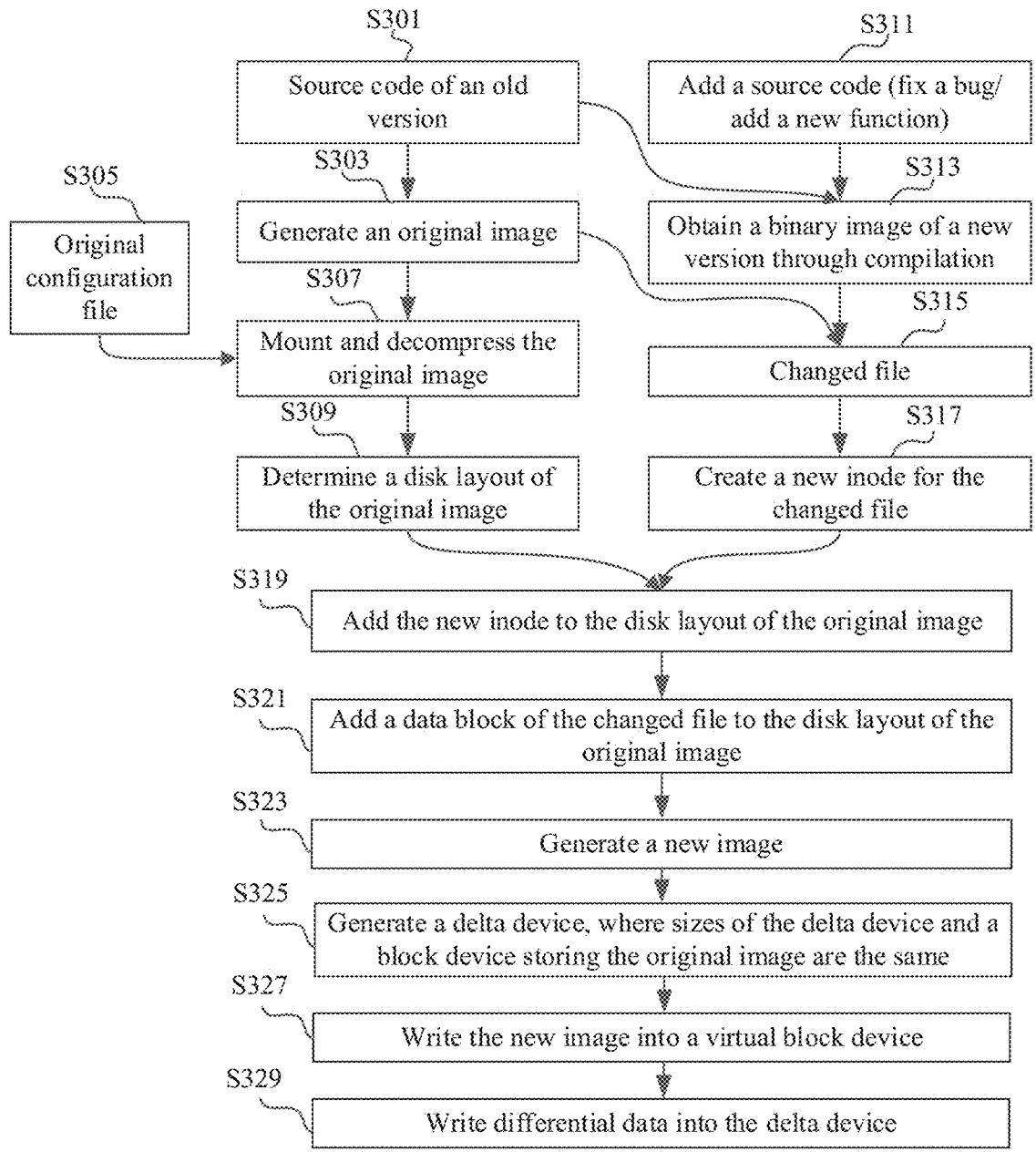
FIG. 17 is a schematic diagram of a specific procedure of generating a delta device on a server side according to Embodiment 2.

FIG. 17 shows a specific procedure of generating a delta device on a server side according to Embodiment 2.

For S301 to S321, refer to S201 to S221 in FIG. 15. Details are not described herein again. The disk layout of the original image determined in S309 includes no check data. A disk layout of a new image obtained through S319 and S321 includes no check data, either.

S323. After S319 and S321, determine the disk layout of the new image based on the first file and the disk layout of the original image, to finally generate the new image. For description of the new image, refer to the foregoing content. Details are not described herein again.

S325. Create a block device whose size is the same as an original block device, where the block device is a delta device. During initial creation, data stored in the delta device may be a default value, for example, 0.

S327. Write the new image into a virtual block device. In the writing process, only the new image generated in S323 is written, and check data of the new image is not written.

S329. Write differential data into the delta device.

Specifically, the differential data between the new image and the original image may be written into the delta device based on a mapping relationship from the virtual block device storing the new image to the block device storing the original image and the delta device. The differential data may be written into the delta device by using an interface of a write raw device (a device not mounted in a file system). In comparison with conventional file reading/writing, an original image 2002 is a read-only file system, and is inapplicable to a file-based write interface. Therefore, to write the differential data into the delta device, the interface of the write raw device may be used, but this is not a limitation. The interface of the write raw device may be a block-based write interface, for example, a memcopy interface.

In Embodiment 2, a part of differential data (namely, a second part of a new image) may be written by using occupied bits of check data on a delta device, without a need to additionally allocate a disk block at a tail of the delta device to write the part of differential data, so that sizes of the delta device and a block device that stores an original image can be the same. Therefore, a patch is matched with the original image.

In this application, the delta device may be referred to as a first block device, and the block device storing the original image may be referred to as a second block device.

The following describes, based on a same technical concept, related apparatuses provided in the embodiments of this application with reference to the accompanying drawings.

Figure 18:
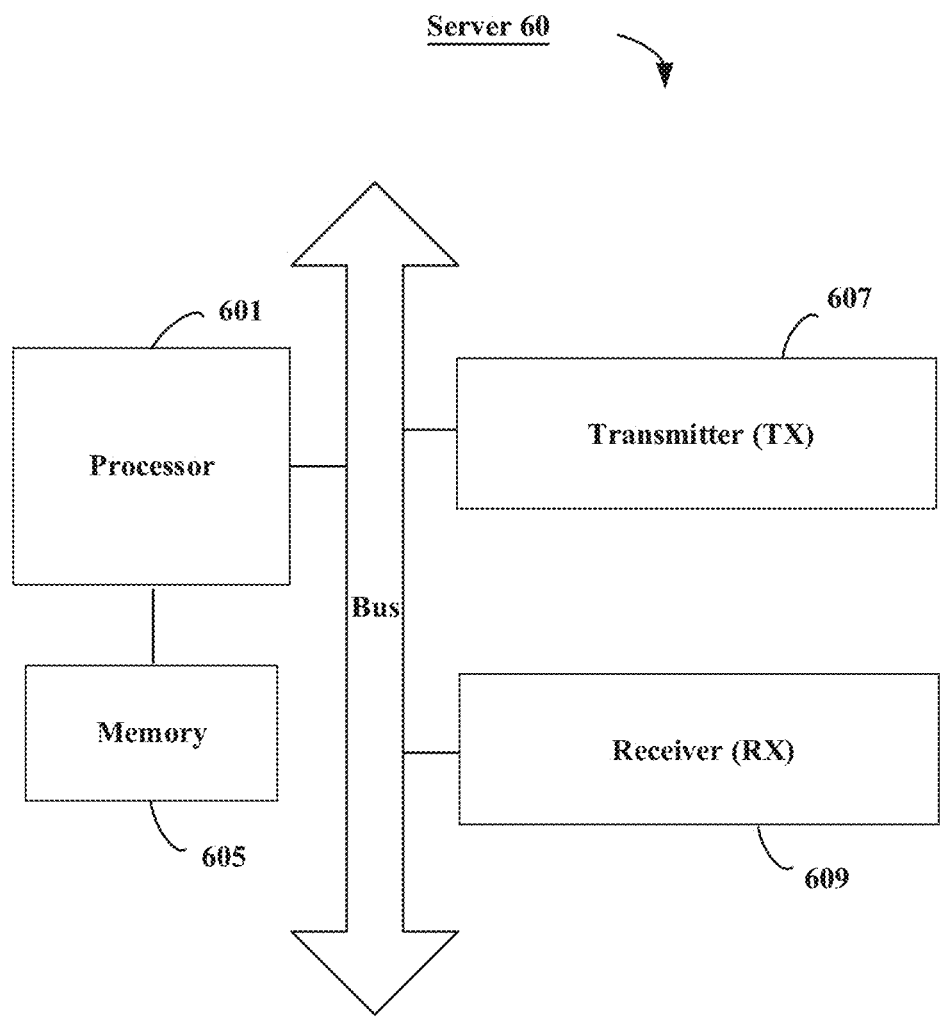
FIG. 18 is a schematic structural diagram of a server according to this application.

FIG. 18 is a schematic structural diagram of a server 60. The server 60 may be the server 11 in the communications system shown in FIG. 1A. As shown in FIG. 18, the server 60 includes one or more processors 601, a transmitter 607, a receiver 609, and a memory 605 that is coupled to the processor 601. These components may be connected through a bus 603 or in another manner. In FIG. 18, an example in which these components are connected through the bus 603 is used.

The transmitter 607 may be configured to perform transmission processing on a signal output by the processor 601. For example, the transmitter 607 may send a patch generated by the processor 601 to an electronic device 70. For description of the patch, refer to the foregoing content. Details are not described herein again. The receiver 609 may be configured by the server 60 to receive a signal transmitted by another device (for example, the electronic device 70), process the received signal, and output a processed signal to the processor 601. For example, the receiver 609 may receive a patch download request sent by the electronic device 70. In some embodiments, the transmitter 607 and the receiver 609 may be considered a wireless modem. In the server 60, there may be one or more transmitters 607 and receivers 609.

The memory 605 is coupled to the processor 601, and is configured to store various software programs and/or a plurality of sets of instructions. In specific implementation, the memory 605 may include a high-speed random access memory, and may also include a non-volatile memory, for example, one or more magnetic disk storage devices, a flash storage device, or another non-volatile solid-state storage device. The memory 605 may store an operating system (hereinafter referred to as a system), for example, an embedded operating system such as uCOS, VxWorks, or RTLinux. The memory 605 may further store a network communication program. The network communication program may be used to communicate with one or more additional devices, one or more terminal devices, and one or more network devices.

The processor 601 may be configured to read and execute computer-readable instructions. Specifically, the processor 601 may be configured to invoke a program stored in the memory 605, for example, an implementation program of a patching method provided in one or more embodiments of this application on a side of the server 60, and execute instructions included in the program.

It should be noted that the server 60 shown in FIG. 18 is merely an implementation of this application. In actual application, the server 60 may further include more or fewer components. This is not limited herein.

Figure 19:
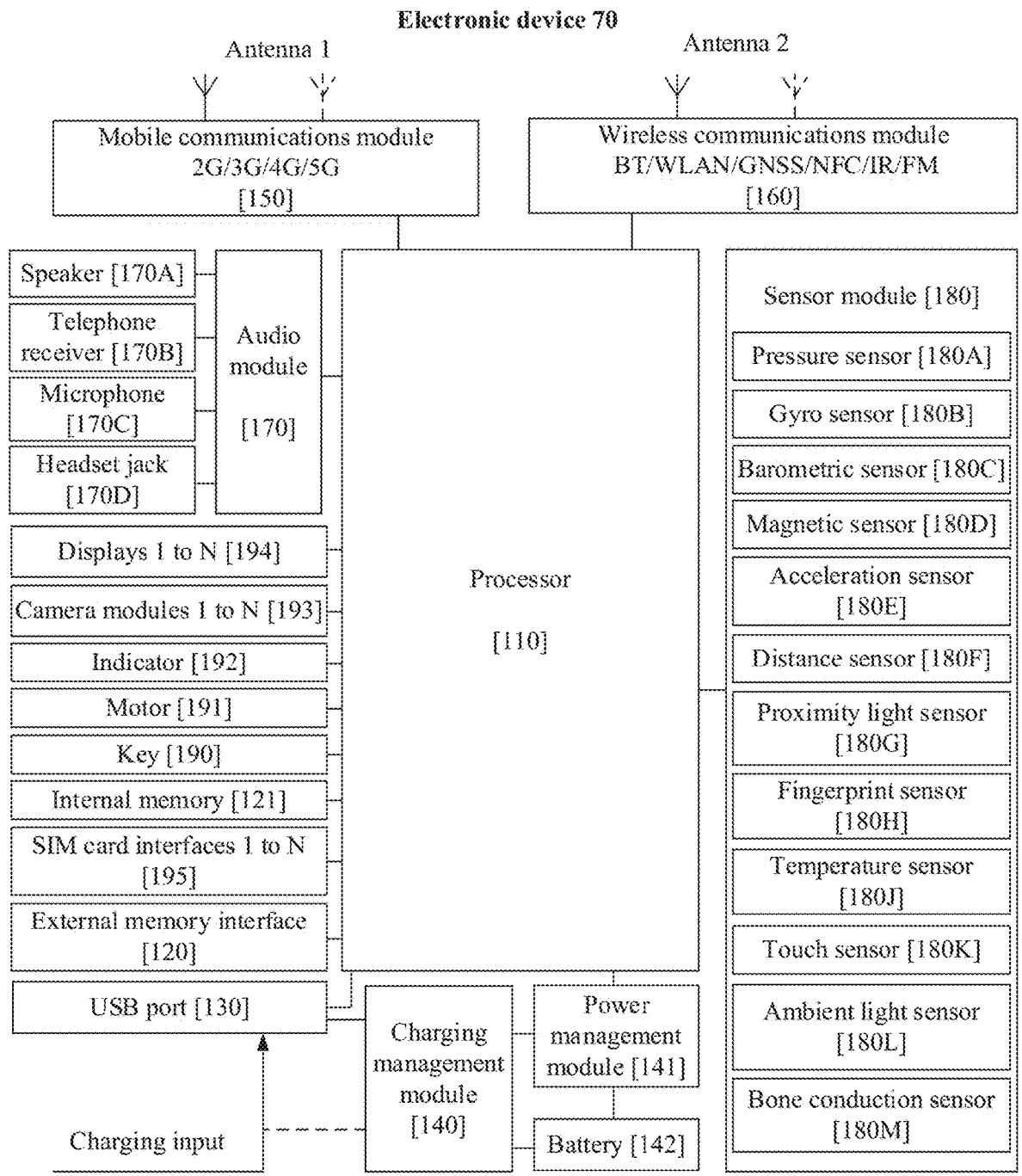
FIG. 19 is a schematic structural diagram of an electronic device according to this application.

FIG. 19 is a schematic structural diagram of an electronic device 70. The electronic device 70 may be the electronic device 13 in the communications system shown in FIG. 1A. As shown in FIG. 19, the electronic device 70 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a telephone receiver 170B, a microphone 170C, a headset jack 170D, a sensor module 180, a key 190, a motor 191, an indicator 192, a camera module 193, a display 194, a subscriber identity module (subscriber identification module, SIM) card interface 195, and the like. The sensor module 180 may include a pressure sensor 180A, a gyro sensor 180B, a barometric sensor 180C, a magnetic sensor 180D, an acceleration sensor 180E, a distance sensor 180F, a proximity light sensor 180G, a fingerprint sensor 180G, a temperature sensor 180J, a touch sensor 180K, an ambient light sensor 180L, a bone conduction sensor 180M, and the like.

It may be understood that the structure shown in this embodiment of the present invention constitutes no specific limitation on the electronic device 70. In some other embodiments of this application, the electronic device 70 may include more or fewer components than those shown in the figure, or combine some components, or split some components, or have different component arrangements. The components shown in the figure may be implemented in hardware, software, or a combination of software and hardware.

The processor 110 may include one or more processing units. For example, the processor 110 may include an application processor (application processor, AP), a central processing unit (central processing unit, CPU), a graphics processing unit (graphics processing unit, GPU), a neural-network processing unit (neural-network processing unit, NPU), a modem processor, an image signal processor (image signal processor, ISP), a controller, a memory, a video codec, a digital signal processor (digital signal processor, DSP), a baseband processor, and the like. Different processing units may be independent components, or may be integrated in one or more processors. In some embodiments, the electronic device 70 may alternatively include one or more processors 110.

The controller may be a nerve center and a command center of the electronic device 70. The controller may generate an operation control signal based on instruction operation code and a time sequence signal, to control instruction fetching and instruction execution.

A memory may be further disposed in the processor 110, and is configured to store instructions and data. In some embodiments, the memory in the processor 110 is a cache memory. The memory may store an instruction or data that has just been used or recycled by the processor 110. If the processor 110 needs to reuse the instruction or the data, the processor may directly invoke the instruction or the data from the memory. Repeated access is avoided, and a waiting time of the processor 110 is reduced. Therefore, efficiency of the electronic device 70 is improved.

In some embodiments, the processor 110 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus, including one serial data line (serial data line, SDA) and one serial clock line (serial clock line, SCL). In some embodiments, the processor 110 may include a plurality of sets of I2C buses. The processor 110 may be separately coupled to the touch sensor 180K, a charger, a flashlight, the camera module 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 70.

The I2S interface may be used for audio communication. In some embodiments, the processor 110 may include a plurality of sets of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call through a Bluetooth headset.

The PCM interface may also be used for audio communication, to sample, quantize, and encode an analog signal. In some embodiments, the audio module 170 and the wireless communications module 160 may be coupled through the PCM bus interface. In some embodiments, the audio module 170 may also transfer an audio signal to the wireless communications module 160 through the PCM interface, to implement a function of answering a call through a Bluetooth headset. Both the I2S interface and the PCM interface may be used for audio communication.

The UART interface is a universal serial data bus used for asynchronous communication. The bus may be a bidirectional communications bus, and the bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music through a Bluetooth headset.

The MIPI interface may be configured to connect the processor 110 to peripheral components such as the display 194 and the camera module 193. The MIPI interface includes a camera serial interface (camera serial interface. CSI), a display serial interface (display serial interface, DSI), and the like. In some embodiments, the processor 110 communicates with the camera module 193 through the CSI interface, to implement a camera function of the electronic device 70. The processor 110 communicates with the display 194 through the DSI interface, to implement a display function of the electronic device 70.

The GPIO interface may be configured by software. The GPIO interface may be configured as a control signal, or may be configured as a data signal. In some embodiments, the GPIO interface may be configured to connect the processor 110 to the camera module 193, the display 194, the wireless communications module 160, the audio module 170, the sensor module 180, and the like. The GPIO interface may be alternatively configured as an I2C interface, an I2S interface, a UART interface, an MIPI interface, and the like.

The USB port 130 is an interface that complies with a USB standard specification, and may be specifically a mini USB interface, a micro USB interface, a USB type-C interface, or the like. The USB port 130 may be configured to connect to the charger to charge the electronic device 70, or may be configured to transmit data between the electronic device 70 and a peripheral device, or may be configured to connect to a headset and play audio through the headset. The interface may be further configured to connect to another electronic device, for example, an AR device.

It may be understood that the interface connection relationship between modules illustrated in this embodiment of the present invention is merely an example for description, and constitutes no limitation on the structure of the electronic device 70. In some other embodiments, the electronic device 70 may alternatively use a different interface connection manner from that in the foregoing embodiments, or a combination of a plurality of interface connection manners.

The charging management module 140 is configured to receive charging input from the charger. The charger may be a wireless charger, or may be a wired charger. In some embodiments of wired charging, the charging management module 140 may receive charging input of a wired charger through the USB port 130. In some embodiments of wireless charging, the charging management module 140 may receive wireless charging input through a wireless charging coil of the electronic device 70. When charging the battery 142, the charging management module 140 may further supply power to the electronic device by using the power management module 141.

The power management module 141 is configured to connect to the battery 142, the charging management module 140, and the processor 110. The power management module 141 receives input from the battery 142 and/or the charging management module 140, and supplies power to the processor 110, the internal memory 121, an external memory, the display 194, the camera module 193, the wireless communications module 160, and the like. The power management module 141 may be further configured to monitor parameters such as a battery capacity, a quantity of battery cycles, and a battery health status (leakage and impedance). In some other embodiments, the power management module 141 may be alternatively disposed in the processor 110. In some other embodiments, the power management module 141 and the charging management module 140 may also be disposed in a same component.

A wireless communication function of the electronic device 70 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 70 may be configured to cover one or more communication frequency bands. Different antennas can also be multiplexed to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that is applied to the electronic device 70 and that includes 2G/3G/4G/5G and the like. The mobile communications module 150 may include at least one filter, switch, power amplifier, low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal obtained after modulation by the modem processor, and convert the signal into an electromagnetic wave through the antenna 1 for radiation. In some embodiments, at least some functional modules of the mobile communications module 150 may be disposed in the processor 110. In some embodiments, at least some functional modules of the mobile communications module 150 and at least some modules of the processor 110 may be disposed in a same component.

The modem processor may include a modulator and a demodulator. The modulator is configured to modulate a to-be-sent low-frequency baseband signal into a medium- and high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transferred to the application processor. The application processor outputs a sound signal through an audio device (not limited to the speaker 170A, the telephone receiver 170B, or the like), or displays an image or a video through the display 194. In some embodiments, the modem processor may be an independent component. In some other embodiments, the modem processor may be independent of the processor 110, and disposed in a same component as the mobile communications module 150 or another functional module.

The wireless communications module 160 may provide a wireless communication solution that is applied to the electronic device 70 and that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), an infrared (infrared. IR) technology, and the like. The wireless communications module 160 may be one or more components integrating at least one communication processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave through the antenna 2 for radiation. For example, the wireless communications module 160 may include a Bluetooth module, a Wi-Fi module, and the like.

In some embodiments, the antenna 1 of the electronic device 70 is coupled to the mobile communications module 150, and the antenna 2 is coupled to the wireless communications module 160, so that the electronic device 70 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system. BDS), a quasi-zenith satellite system (quasi-zenith satellite system, QZSS) and/or a satellite based augmentation system (satellite based augmentation systems, SBAS).

The electronic device 70 may implement a display function by using the GPU, the display 194, the application processor, and the like. The GPU is a microprocessor for image processing, and is connected to the display 194 and the application processor. The GPU is configured to perform mathematical and geometric calculation for graphics rendering. The processor 110 may include one or more GPUs that execute instructions to generate or change display information.

The electronic device 70 may implement a camera function by using the camera module 193, the ISP, the video codec, the GPU, the display 194, the application processor AP, the neural-network processing unit NPU, and the like.

The digital signal processor is configured to process a digital signal, and may process another digital signal in addition to a digital image signal. For example, when the electronic device 70 performs frequency selection, the digital signal processor is configured to perform Fourier transform on frequency energy.

The video codec is configured to compress or decompress a digital video. The electronic device 70 may support one or more video codecs. In this way, the electronic device 70 may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor. By drawing on a structure of a biological neural network, for example, by drawing on a transmission mode between human brain neurons, the NPU quickly processes input information, and may further continuously perform self-learning. Application such as intelligent cognition of the electronic device 70, for example, image recognition, face recognition, speech recognition, and text understanding, may be implemented by using the NPU.

The external memory interface 120 may be configured to connect to an external memory card, for example, a micro SD card, to expand a storage capability of the electronic device 70. The external memory card communicates with the processor 110 through the external memory interface 120, to implement a data storage function. For example, data such as music, a photo, and a video are stored in the external memory card.

The internal memory 121 may be configured to store one or more computer programs, and the one or more computer programs include instructions. The processor 110 may run the instructions stored in the internal memory 121, so that the electronic device 70 performs the photographing preview method of the electronic device provided in some embodiments of this application, various functional applications, data processing, and the like. The internal memory 121 may include a program storage area and a data storage area. The program storage area may store an operating system. The program storage area may further store one or more applications (for example, Gallery or Contacts), and the like. The data storage area may store data (for example, a photo or a contact) created during the use of the electronic device 70. In addition, the internal memory 121 may include a high-speed random access memory, and may further include a non-volatile memory, such as at least one magnetic disk storage component, a flash storage component, or a universal flash storage (universal flash storage, UFS).

The electronic device 70 may implement an audio function, such as music playing or recording, by using the audio module 170, the speaker 170A, the telephone receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode audio signals. In some embodiments, the audio module 170 may be disposed in the processor 110, or some functional modules of the audio module 170 may be disposed in the processor 110.

The speaker 170A, also referred to as a "horn", is configured to convert an audio electrical signal into a sound signal. The electronic device 70 may listen to music or listen to a hands-free call through the speaker 170A.

The telephone receiver 170B, also referred to as an "earpiece", is configured to convert an audio electrical signal into a sound signal. When the electronic device 70 receives a call or voice information, a voice may be received by placing the telephone receiver 170B close to an ear.

The microphone 170C, also referred to as a "MIC" or "mike", is configured to convert the sound signal into an electrical signal. When making a call or sending voice information, a user may make a sound by approaching the microphone 170C through a mouth, and input the sound signal to the microphone 170C. The electronic device 70 may be provided with at least one microphone 170C. In some other embodiments, the electronic device 70 may be provided with two microphones 170C, so that in addition to collecting a sound signal, a noise reduction function can be further implemented. In some other embodiments, the electronic device 70 may be alternatively provided with three, four, or more microphones 170C, to collect a sound signal, perform noise reduction, identify a sound source, implement a directional recording function, and the like.

The headset jack 170D is configured to connect to a wired headset. The headset jack 170D may be the USB port 130, or may be a 3.5 mm open mobile terminal platform (open mobile terminal platform. OMTP) standard interface or a cellular telecommunications industry association of the USA (cellular telecommunications industry association of the USA, CTIA) standard interface.

The pressure sensor 180A is configured to sense a pressure signal and may convert the pressure signal into an electrical signal. In some embodiments, the pressure sensor 180A may be disposed on the display 194. There are many types of pressure sensors 180A, such as a resistive pressure sensor, an inductive pressure sensor, a capacitive pressure sensor. The capacitive pressure sensor may be a parallel plate including at least two electrically conductive materials. When a force is applied to the pressure sensor 180A, a capacitance between electrodes changes. The electronic device 70 determines pressure strength based on the change of the capacitance. When a touch operation acts on the display 194, the electronic device 70 detects strength of the touch operation based on the pressure sensor 180A. The electronic device 70 may also calculate a touch position based on a detection signal of the pressure sensor 180A. In some embodiments, touch operations that act on a same touch position but have different touch operation strength may correspond to different operation instructions. For example, when a touch operation whose touch operation strength is less than a first pressure threshold is performed on an icon of Messages, an instruction for viewing an SMS message is executed; or when a touch operation whose touch operation strength is greater than or equal to a first pressure threshold is performed on an icon of Messages, an instruction for creating a new SMS message is executed.

The gyro sensor 180B may be configured to determine a motion posture of the electronic device 70. In some embodiments, an angular velocity of the electronic device 70 about three axes (namely, x, y, and z axes) may be determined by the gyro sensor 180B. The gyro sensor 180B may be configured for photographing stabilization. For example, when a shutter is pressed, the gyro sensor 180B detects a jitter angle of the electronic device 70, and calculates, based on the angle, a distance that needs to be compensated for by a lens module, so that the lens eliminates jitter of the electronic device 70 through a reverse motion, to implement stabilization. The gyro sensor 180B may also be configured for navigation and somatosensory game scenes.

The barometric sensor 180C is configured to measure atmospheric pressure. In some embodiments, the electronic device 70 calculates an altitude by using a pressure value measured by the barometric sensor 180C, and assists in positioning and navigation.

The magnetic sensor 180D includes a Hall effect sensor. The electronic device 70 may detect opening or closure of a flip leather cover by using the magnetic sensor 180D. In some embodiments, when the electronic device 70 is a flip phone, the electronic device 70 may detect opening or closure of a flip cover based on the magnetic sensor 180D. Further, based on a detected open or closed state of the leather cover or the flip cover, a feature such as automatic unlocking in a case of flipping open is set.

The acceleration sensor 180E may detect magnitudes of accelerations of the electronic device 70 in all directions (usually on three axes). When the electronic device 70 is stationary, the acceleration sensor 180E may detect a magnitude and a direction of gravity. The acceleration sensor 180E may also be configured to identify a posture of the electronic device, and is applied to applications such as landscape/portrait screen switching and a pedometer. The distance sensor 180F is configured to measure a distance. The electronic device 70 may measure the distance by using infrared or a laser. In some embodiments, in a photographing scenario, the electronic device 70 may measure a distance by using the distance sensor 180F, to implement fast focusing.

The proximity light sensor 180G may include, for example, a light emitting diode (LED) and a light detector such as a photodiode. The light emitting diode may be an infrared light emitting diode. The electronic device 70 emits infrared light by using the light emitting diode. The electronic device 70 uses the photodiode to detect infrared reflected light from a nearby object. When sufficient reflected light is detected, the electronic device 70 may determine that there is an object near the electronic device 70. When detecting insufficient reflected light, the electronic device 70 may determine that there is no object near the electronic device 70. The electronic device 70 may detect, by using the proximity light sensor 180G, that the electronic device 70 held by the user is close to the ear for a call, to automatically turn off a screen to save power. The proximity light sensor 180G may also be used in a leather case mode and a pocket mode for automatic unlocking and locking.

The ambient light sensor 180L is configured to perceive ambient light brightness. The electronic device 70 may adaptively adjust brightness of the display 194 based on the perceived ambient light brightness. The ambient light sensor 180L may also be configured to automatically adjust white balance during photographing. The ambient light sensor 180L may also cooperate with the proximity light sensor 180G to detect whether the electronic device 70 is in a pocket to prevent accidental touch.

The fingerprint sensor 180G is configured to collect a fingerprint. The electronic device 70 may implement fingerprint unlocking, accessing an application lock, fingerprint photographing, fingerprint answering, and the like by using features of the collected fingerprint.

The temperature sensor 180J is configured to detect a temperature. In some embodiments, the electronic device 70 executes a temperature processing policy by using the temperature detected by the temperature sensor 1803. For example, when the temperature reported by the temperature sensor 180J exceeds a threshold, the electronic device 70 performs performance reduction of the processor located near the temperature sensor 180J, to reduce power consumption and perform thermal protection. In some other embodiments, when the temperature is lower than another threshold, the electronic device 70 heats the battery 142 to avoid abnormal shutdown of the electronic device 70 caused by the low temperature. In some other embodiments, the electronic device 70 boosts an output voltage of the battery 142 when the temperature is lower than another threshold, to avoid abnormal shutdown caused by the low temperature.

The touch sensor 180K may also be referred to as a touch panel or a touch-sensitive surface. The touch sensor 180K may be disposed in the display 194, and the touch sensor 180K and the display 194 constitute a touchscreen. The touch sensor 180K is configured to detect a touch operation acting on or near the touch sensor 180K. The touch sensor may transfer the detected touch operation to the application processor, to determine a touch event type. Visual output related to the touch operation may be provided through the display 194. In some other embodiments, the touch sensor 180K may be alternatively disposed on a surface of the electronic device 70, and a position of the touch sensor 180K is different from that of the display 194.

The bone conduction sensor 180M may obtain a vibration signal. In some embodiments, the bone conduction sensor 180M may obtain a vibration signal of a human vocal vibratory bone mass. The bone conduction sensor 180M may also come into contact with a pulse of a human body and receive a blood pressure pulse signal. In some embodiments, the bone conduction sensor 180M may be alternatively disposed in a headset to form a bone conduction headset. The audio module 170 may parse out a voice signal based on the vibration signal of the vocal vibratory bone mass obtained by the bone conduction sensor 180M, to implement a voice function. The application processor may parse heart rate information based on the blood pressure pulse signal obtained by the bone conduction sensor 180M, to implement a heart rate detection function.

The key 190 includes a power key, a volume key, and the like. The key 190 may be a mechanical key or a touch key. The electronic device 70 may receive key input to generate key signal input related to user settings and function control of the electronic device 70.

The motor 191 may generate a vibration prompt. The motor 191 may be configured for an incoming vibration prompt, or may be configured for touch vibration feedback. For example, touch operations acting on different applications (for example, photographing or audio playing) may correspond to different vibration feedback effects. The motor 191 may also correspond to different vibration feedback effects for touch operations acting on different areas of the display 194. Different application scenarios (for example, a time reminder, information receiving, an alarm clock, and a game) may also correspond to different vibration feedback effects. A touch vibration feedback effect may also be customized.

The indicator 192 may be an indicator lamp, and may be configured to indicate a charging status or a power change, or may be configured to indicate a message, a missed call, a notification, or the like.

The SIM card interface 195 is configured to connect to a SIM card. The SIM card may be inserted into or removed from the SIM card interface 195, to implement contact with and separation from the electronic device 70. The electronic device 70 may support one or N SIM card interfaces, and N is a positive integer greater than 1. The SIM card interface 195 may support a nano-SIM card, a micro-SIM card, a SIM card, and the like. A plurality of cards may be inserted into a same SIM card interface 195 at the same time. Types of the plurality of cards may be the same or may be different. The SIM card interface 195 may also be compatible with different types of SIM cards. The SIM card interface 195 may also be compatible with an external memory card. The electronic device 70 interacts with a network through the SIM card, to implement functions such as call and data communication. In some embodiments, the electronic device 70 uses an eSIM, namely, an embedded SIM card. The eSIM card may be embedded in the electronic device 70, and cannot be separated from the electronic device 70.

The electronic device 70 may display, through the display 194, a user interface illustrated in FIG. 1B for downloading a patch and updating software. The electronic device 70 may detect a touch operation in each user interface by using the touch sensor 180K, for example, a click operation (for example, a touch operation and a double-click operation on an icon) in each user interface, for another example, an upward or downward slide operation in each user interface, or an operation of performing a circle drawing gesture. In some embodiments, the electronic device 70 may detect, by using the gyro sensor 180B, the acceleration sensor 180E, and the like, a motion gesture performed by the user holding the electronic device 70, for example, shaking the electronic device. In some embodiments, the electronic device 70 may detect a non-touch gesture operation by using the camera module 193 (for example, a 3D camera or a depth camera).

The electronic device 70 may download a patch from a server 60 by using the mobile communications module 150 or the wireless communications module 160 to update software.

Figure 20:
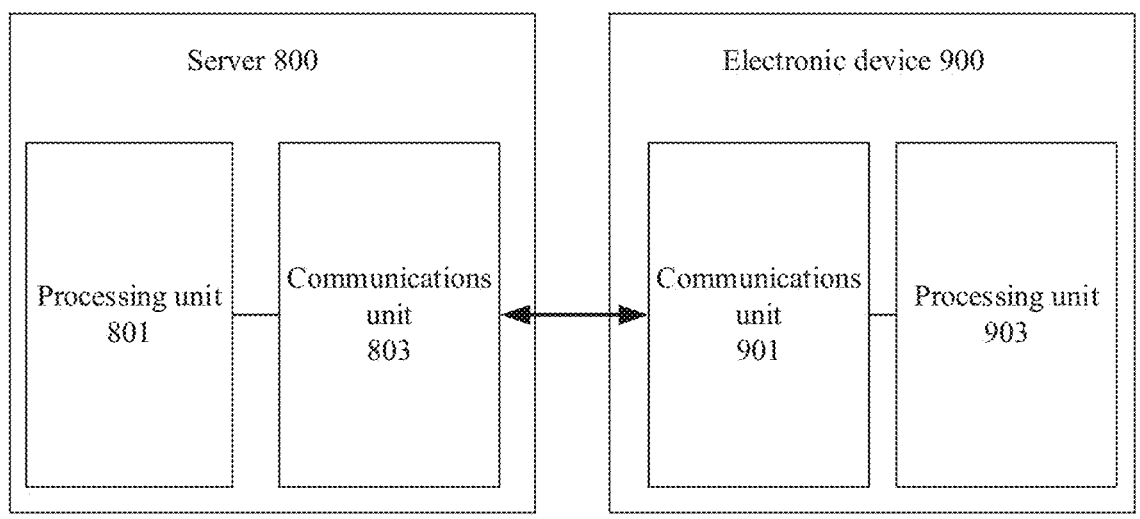
FIG. 20 is another schematic structural diagram of a communications system and a related device according to this application.

FIG. 20 shows a wireless communications system 100 and a server 80 and an electronic device 90 in the wireless communications system 100 according to an embodiment of this application. The server 80 may be the server in the foregoing method embodiments, and the electronic device 90 may be the electronic device in the foregoing method embodiments. The server 80 may include a function or a module or a means (means) for performing the server in the foregoing method embodiments. The electronic device 90 may include a function or a module or a means (means) for performing the electronic device in the foregoing method embodiments. The foregoing functions, modules, units, or means (means) may be implemented by software, or may be implemented by hardware, or may be implemented by hardware executing corresponding software.

As shown in FIG. 20, the server 80 may include a communications unit 801 and a processing unit 803.

The processing unit 803 may be configured to generate a new image based on an original image and a changed first file. The first file is a changed file in the original image. The processing unit 803 may be further configured to write the new image into a virtual block device, where the virtual block device may be obtained by mapping a first block device and a second block device. The second block device stores the original image. The processing unit 803 may be further configured to write differential data between the new image and the original image into the first block device based on a mapping relationship from the virtual block device to the first block device and the second block device.

The communications unit 801 may be configured to send a patch to the electronic device 90, where the patch includes the differential data stored in the first block device.

As shown in FIG. 20, the electronic device 90 may include a communications unit 901 and a processing unit 903.

The communications unit 901 may be configured to receive the patch sent by the server 80.

The processing unit 903 may be configured to write the differential data in the patch into the first block device, and then map the first block device and the second block device to the virtual block device. Data stored in the virtual block device constitutes the new image. The processing unit 903 may be further configured to mount the virtual block device, and read and install the new image.

The new image may include a first part and a second part, a disk layout of the first part is the same as a disk layout of the original image, the second part is appended to an end of the first part, the second part includes a first index node inode, and the first inode is an inode of the changed first file. The differential data in the patch may include the following two parts of data: the second part and differential data between the first part and the original image.

An inode of the first file in the first part of the new image is invalid. "invalid" means that an attribute (such as a file size, a file type, a file creation time, or a file modification time) of the changed first file in the new image and a pointer of a data block of the changed first file in the new image are no longer determined based on the inode of the first file in the first part, but are determined based on the first inode in the second part.

It can be learned that, through implementation of the methods described in the first aspect and the second aspect, because the disk layout of the first part of the new image is the same as the disk layout of the original image, there is little or even no non-zero differential data between the first part and the original image, a large amount of zero differential data occurs, and the patch is quite small.

In an embodiment, in addition to the first inode, the second part may further include a new data block of the first file. In this application, the new data block may be referred to as a first data block. In the new image, data blocks of the first file may include the new data block and a data block of the first file in the first part. Pointers in the new inode may point to the new data block and the data block of the first file in the first part Optionally, data of the data block of the first file in the first part may be the same as data of a data block of the first file in the original image. In this case, the differential data between the first part and the original image is 0. This is not limited. The data of the data block of the first file in the first part may be alternatively different from the data of the data block of the first file in the original image. In this application, the data block of the first file in the first part may be referred to as a second data block, and the data block of the first file in the original image may be referred to as a third data block.

This embodiment may be used for the following scenario: Data of the first file is modified, the data block of the first file in the original image is insufficient to carry data of the changed first file, and the inode of the first file also becomes larger.

In another embodiment, in addition to the first inode, the second part may further include a new data block storing full data of the changed first file. In this application, the new data block may be referred to as a fourth data block. The new data block of the first file may be a group of consecutive disk blocks, and may be used to store the full data of the changed first file. A pointer in the first inode may point to the fourth data block. In this case, the differential data between the first part and the original image is 0. Non-zero differential data in the patch includes only the second part.

Optionally, the fourth data block may be a group of consecutive disk blocks, and is used to store the full data of the changed first file.

This embodiment may be used for the following scenario: Data in a data block is not compressed. The data block of the first file in the original image is insufficient to carry data of the changed first file, and the inode of the first file also becomes larger.

In another embodiment, the pointer in the first inode may point to the data block of the first file in the first part. In the new image, the data block of the first file is the data block of the first file in the first part. The data of the data block and the data of the data block of the first file in the original image may be the same or different. In this application, the data block of the first file in the first part may be referred to as a second data block, and the data block of the first file in the original image may be referred to as a third data block.

This embodiment may be used for the following scenario: Description information of the first file changes, and the inode of the first file in the original image is insufficient to carry description information of the changed first file and pointer information of the data block of the first file. The data of the first file does not change, or the data block of the first file in the original image can carry the data of the changed first file. If the data of the first file does not change, the data of the data block of the first file in the first part of the new image is the same as the data of the data block of the first file in the original image. If the data of the first file changes, the data of the data block of the first file in the first part of the new image is different from the data of the data block of the first file in the original image.

In some embodiments, the patch may further carry a mapping table, so that after downloading the patch, the electronic device merges the patch and the original image into the new image based on the mapping table. Specifically, when the virtual block device and the second block device are compared disk block by disk block, the mapping relationship may be determined, and further, the mapping table is determined based on the mapping relationship.

In some embodiments, a disk block (which may be referred to as a first disk block) configured for check data in a delta device may be used to carry a part of differential data, where the part of differential data is the second part of the new image. In other words, the part of differential data (namely, the second part of the new image) may be written by using occupied bits of the check data on the delta device, without a need to additionally allocate a disk block at a tail of the delta device to write the part of differential data, so that sizes of the delta device and the block device that stores the original image can be the same. Therefore, the patch is matched with the original image.

It may be understood that, for specific implementation of each functional unit included in the server 80 and the electronic device 90, refer to the foregoing method embodiments. Details are not described herein again.

An embodiment of this application further provides a computer-readable storage medium, where the computer-readable storage medium includes one or more pieces of program code, and the one or more programs include instructions. When a processor in a server executes the program code, the server performs the server-side patching method described in the foregoing embodiment.

An embodiment of this application further provides a computer-readable storage medium, where the computer-readable storage medium includes one or more pieces of program code, and the one or more programs include instructions. When a processor in an electronic device executes the program code, the electronic device performs the electronic device-side patching method described in the foregoing embodiment.

An embodiment of this application further provides a computer program product, where the computer program product includes computer-executable instructions, and the computer-executable instructions are stored in a computer-readable storage medium. At least one processor of a server may read the computer-executable instructions from the computer-readable storage medium, and the at least one processor executes the computer-executable instructions, so that the server is enabled to perform the server-side patching method described in the foregoing embodiment.

An embodiment of this application further provides a computer program product, where the computer program product includes computer-executable instructions, and the computer-executable instructions are stored in a computer-readable storage medium. At least one processor of an electronic device may read the computer-executable instructions from the computer-readable storage medium, and the at least one processor executes the computer-executable instructions, so that the electronic device is enabled to perform the electronic device-side patching method described in the foregoing embodiment.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated.

The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The foregoing descriptions about implementations allow a person skilled in the art to understand that, for the purpose of convenient and brief description, division of the foregoing functional modules is used as an example for illustration. In actual application, the foregoing functions can be allocated to different modules and implemented based on a requirement, in other words, an inner structure of an apparatus is divided into different functional modules to implement all or some of the functions described above.

In the embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A patching method implemented by a server, wherein the patching method comprises:
generating, based on an original image and a first file, a new image comprising a first part and a second part, wherein a first disk layout of the first part is the same as a second disk layout of the original image, wherein the second part is appended to an end of the first part, wherein the second part comprises a first index node (inode) of the first file, and wherein the first file is a changed file in the original image;
writing the new image into a virtual block device that is obtained based on mapping a first block device and a second block device, wherein the second block device comprises the original image;
writing first differential data between the new image and the original image into the first block device based on a mapping relationship from the virtual block device to the first block device and the second block device, wherein the first differential data comprises the second part and second differential data between the first part and the original image; and
sending, to an electronic device, a patch comprising the first differential data.

2. The patching method of claim 1, wherein the second part further comprises a first data block, wherein the first data block and a second data block constitute a third data block of the first file in the new image, wherein the second data block is of the first file and is in the first part, and wherein pointers in the first inode point to the first data block and the second data block.

3. The patching method of claim 2, wherein first data of the second data block is the same as second data of a fourth data block, wherein the fourth data block is of the first file and is in the original image, and wherein the second differential data is zero.

4. The patching method of claim 1, wherein the second part further comprises a first data block configured to store full data of the first file, wherein a pointer in the first inode points to the first data block, and wherein the second differential data is zero.

5. The patching method of claim 1, wherein a pointer in the first inode points to a first data block of the first file in the first part.

6. The patching method of claim 5, wherein third data of the first data block is the same as fourth data of a second data block, wherein the second data block is of the first file in the original image, and wherein the second differential data is zero.

7. The patching method of claim 1, wherein, on the first block device, the second part is on a first disk block that is configured for check data in the second block device, and wherein the check data checks the first differential data.

8. The patching method of claim 1, wherein the patch further comprises a mapping table that records the mapping relationship from the virtual block device to the first block device and the second block device.

9. A patching method implemented by an electronic device, wherein the patching method comprises:
  receiving, from a server, a patch comprising first differential data, wherein the first differential data comprises a second part of a new image and second differential data between a first part of the new image and an original image, wherein the new image is based on the original image and a first file, wherein the first file is a changed file in the original image, wherein a first disk layout of the first part is the same as a second disk layout of the original image, wherein the second part is appended to an end of the first part, and wherein the second part comprises a first index node (inode) of the first file;
  writing the first differential data into a first block device;
  mapping the first block device and a second block device that stores the original image to a virtual block device;
  mounting the virtual block device; and
  reading and installing the new image stored in the virtual block device.

10. The patching method of claim 9, wherein the second part further comprises a first data block, wherein the first data block and a second data block constitute a third data block of the first file in the new image, wherein the second data block is of the first file in the first part, and wherein pointers in the first inode point to the first data block and the second data block.

11. The patching method of claim 10, wherein first data of the second data block is the same as second data of a fourth data block of the first file in the original image, and wherein the second differential data is zero.

12. The patching method of claim 9, wherein the second part further comprises a first data block configured to store full data of the first file, wherein a pointer in the first inode points to the first data block, and wherein the second differential data is zero.

13. The patching method of claim 9, wherein a pointer in the first inode points to a first data block of the first file in the first part.

14. The patching method of claim 13, wherein third data of the first data block is the same as fourth data of a second data block of the first file in the original image, and wherein the second differential data is zero.

15. The patching method of claim 9, wherein, on the first block device, the second part is carried on a first disk block that is configured for check data in the second block device, and wherein the check data checks the first differential data.

16. The patching method of claim 9, wherein the patch further comprises a mapping table that records a mapping relationship from the virtual block device to the first block device and the second block device.

17. An electronic device comprising:
  a receiver configured to receive, from a server, a patch comprising first differential data, wherein the first differential data comprises a second part of a new image and second differential data between a first part of the new image and an original image, wherein the new image is based on the original image and a first file, wherein the first file is a changed file in the original image, wherein a first disk layout of the first part is the same as a second disk layout of the original image, wherein the second part is appended to an end of the first part, and wherein the second part comprises a first index node (inode) of the first file; and
  a processor coupled to the receiver and configured to:
    write the first differential data into a first block device;
    map the first block device and a second block device that stores the original image to a virtual block device;
    mount the virtual block device; and
    read and install the new image stored in the virtual block device.

18. The electronic device of claim 17, wherein the second part further comprises a first data block, wherein the first data block and a second data block constitute a third data block of the first file in the new image, wherein the second data block is of the first file in the first part, and wherein pointers in the first inode point to the first data block and the second data block.

19. The electronic device of claim 18, wherein first data of the second data block is the same as second data of a fourth data block of the first file in the original image, and wherein the second differential data is zero.

20. The electronic device of claim 17, wherein the second part further comprises a fifth data block configured to store full data of the first file, wherein a pointer in the first inode points to the fifth data block, and wherein the second differential data is zero.

* * * * *